(12) United States Patent
Pyper et al.

(10) Patent No.: US 10,099,270 B2
(45) Date of Patent: Oct. 16, 2018

(54) TWO-PIECE GUIDE PIN AND METHOD

(71) Applicant: STANDARD LIFTERS, INC., Grand Rapids, MI (US)

(72) Inventors: Joel T. Pyper, Grand Rapids, MI (US); Scott M. Breen, Marne, MI (US)

(73) Assignee: STANDARD LIFTERS, INC., Grand Rapids, MI (US)

( * ) Notice: Subject to any disclaimer, the term of this patent is extended or adjusted under 35 U.S.C. 154(b) by 352 days.

(21) Appl. No.: 14/990,824

(22) Filed: Jan. 8, 2016

(65) Prior Publication Data

US 2016/0114372 A1 Apr. 28, 2016

Related U.S. Application Data

(63) Continuation of application No. 14/085,968, filed on Nov. 21, 2013, now Pat. No. 9,259,809, which is a continuation of application No. 12/792,240, filed on Jun. 2, 2010, now Pat. No. 8,616,038.

(51) Int. Cl.
| | |
|---|---|
| *B21D 37/12* | (2006.01) |
| *B21J 13/02* | (2006.01) |
| *B21K 25/00* | (2006.01) |
| *B23P 15/24* | (2006.01) |

(52) U.S. Cl.
CPC .............. *B21D 37/12* (2013.01); *B21J 13/02* (2013.01); *B21K 25/00* (2013.01); *B23P 15/24* (2013.01); *Y10T 83/2159* (2015.04)

(58) Field of Classification Search
CPC ........... B21D 37/12; B21J 13/02; B21K 25/00
See application file for complete search history.

(56) References Cited

U.S. PATENT DOCUMENTS

| | | |
|---|---|---|
| 2,487,233 A | 11/1949 | Gerke |
| 2,663,180 A | 12/1953 | Benedict |
| 3,126,922 A | 3/1964 | Randlett et al. |
| 3,190,703 A | 6/1965 | Thomson et al. |
| 3,474,656 A | 10/1969 | Kraft |
| 3,514,166 A | 5/1970 | Coley |
| 4,036,056 A | 7/1977 | Saunders |
| 4,135,770 A | 1/1979 | Doherty et al. |
| 4,199,313 A | 4/1980 | Bohnenberger |
| 4,483,173 A | 11/1984 | Duhamel |
| 4,696,180 A | 9/1987 | Zandel |
| 4,732,033 A | 3/1988 | Smedberg et al. |
| 4,742,746 A | 5/1988 | Olsson |
| 4,796,460 A | 1/1989 | Smedberg et al. |
| 4,900,017 A | 2/1990 | Bold, Jr. |
| 4,926,563 A | 5/1990 | Smith |

(Continued)

*Primary Examiner* — Teresa M Ekiert
(74) *Attorney, Agent, or Firm* — Price Heneveld LLP

(57) ABSTRACT

A two-piece guide pin for metal forming dies includes a guide pin body formed from a cut length of an elongate, solid bar of stock having a cylindrical shape and a hard and smooth finished exterior surface with an outside diameter selected for close reception and reciprocal motion in an associated die bore. An alignment member is formed on a first end of the guide pin body. A guide pin head is formed from a cut length of an elongate, solid bar of stock having an outside diameter that is substantially greater than that of the guide pin body, and is rigidly connected with the second end of the guide pin body in a generally concentric relationship to define an enlarged head that positively limits travel between an associated die shoe and die pad.

10 Claims, 12 Drawing Sheets

(56) References Cited

U.S. PATENT DOCUMENTS

| | | |
|---|---|---|
| 5,113,736 A | 5/1992 | Meyerle |
| 5,245,904 A | 9/1993 | Meyerle |
| 5,328,276 A | 7/1994 | Linteau |
| 5,397,135 A | 3/1995 | Smith |
| 5,722,280 A | 3/1998 | Bodnar |
| 5,758,374 A | 6/1998 | Ronci |
| 5,788,903 A | 8/1998 | Allgaier |
| 6,220,946 B1 | 4/2001 | Arnold |
| 6,408,728 B1 | 6/2002 | Tsuji et al. |
| 6,755,104 B2 | 6/2004 | Grant |
| 6,848,290 B2 | 2/2005 | Pyper et al. |
| 6,925,922 B2 | 8/2005 | Manabe et al. |
| 6,986,273 B2 | 1/2006 | Rager |
| 7,000,446 B2 | 2/2006 | Nieschulz et al. |
| 7,004,007 B2 | 2/2006 | Kruger et al. |
| 7,114,365 B2 | 10/2006 | Rooney, Jr. et al. |
| 7,326,092 B2 | 2/2008 | Fedder et al. |
| 8,074,515 B2 | 12/2011 | Van Kann et al. |
| 8,291,603 B2 | 10/2012 | Saegeser et al. |
| 8,567,227 B2 | 10/2013 | Cotter |
| 2009/0193865 A1 | 8/2009 | Pyper et al. |
| 2011/0192206 A1 | 8/2011 | Cotter |
| 2011/0296893 A1 | 12/2011 | Breen et al. |

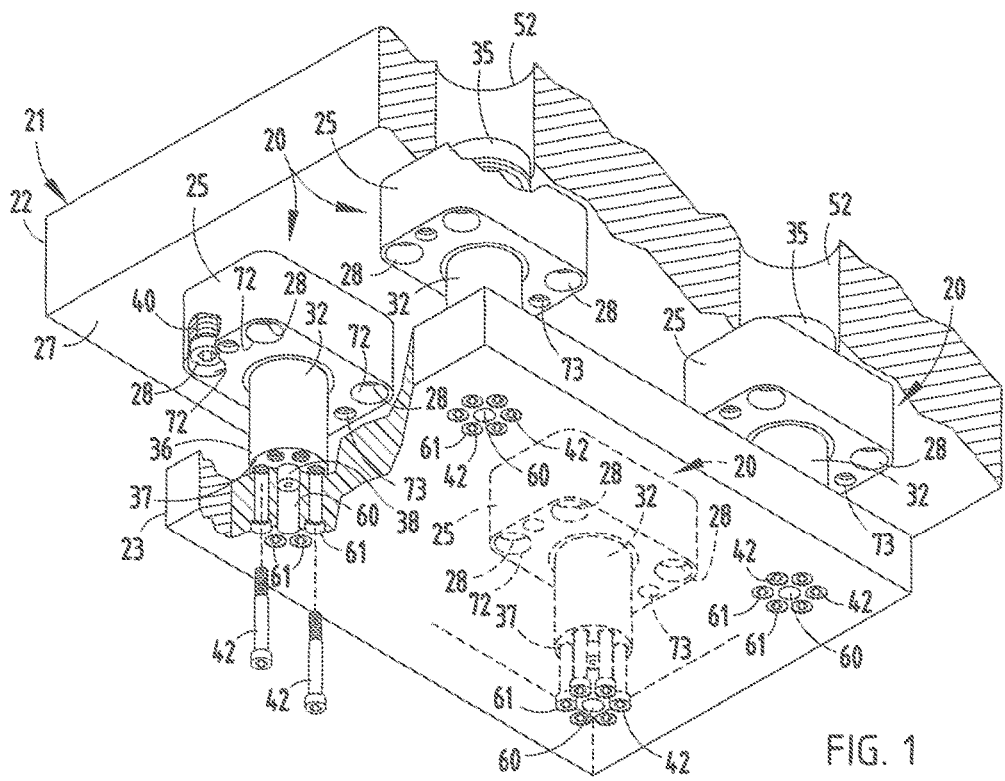
FIG. 1
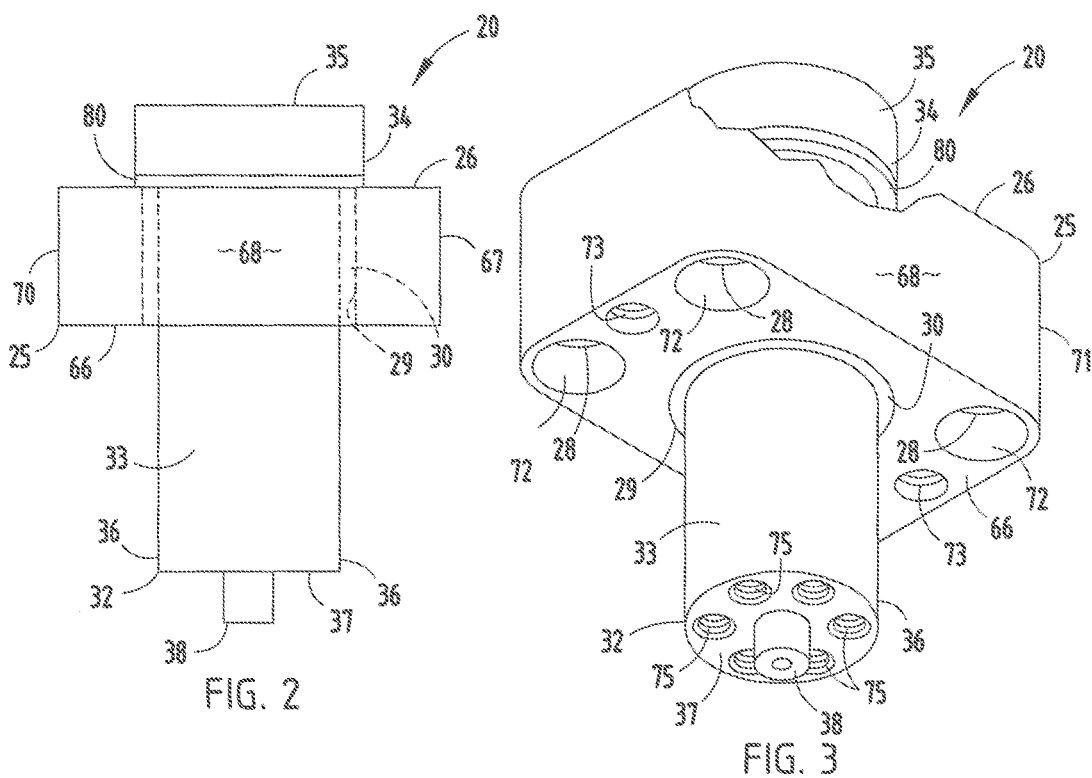
FIG. 2
FIG. 3

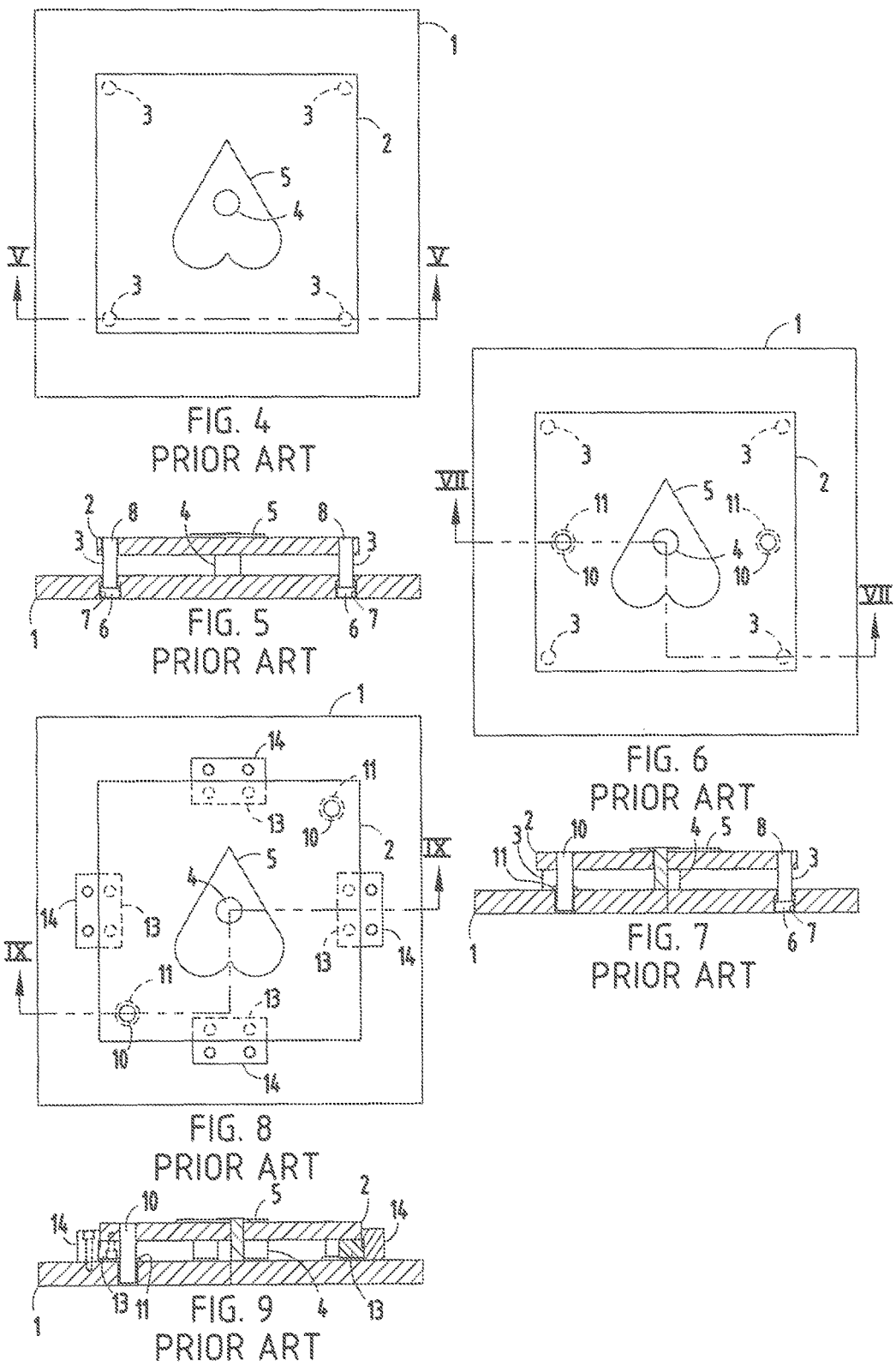

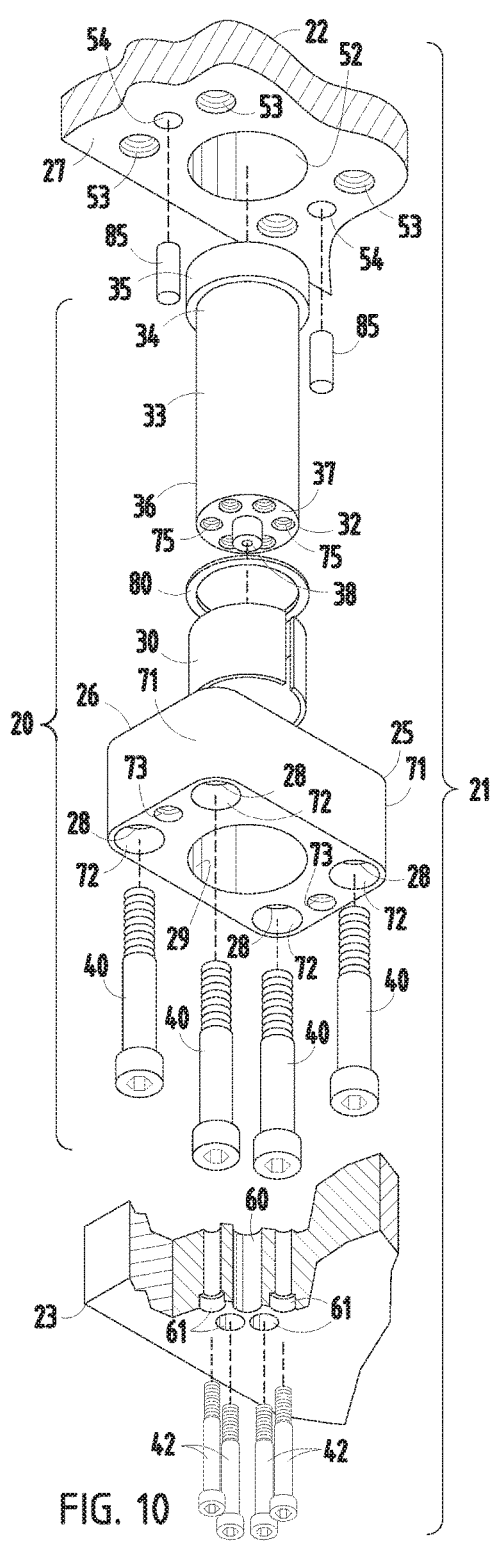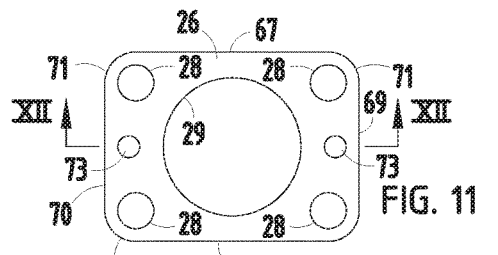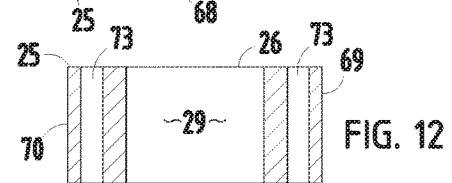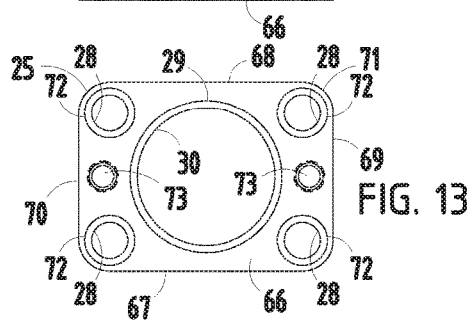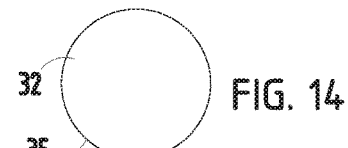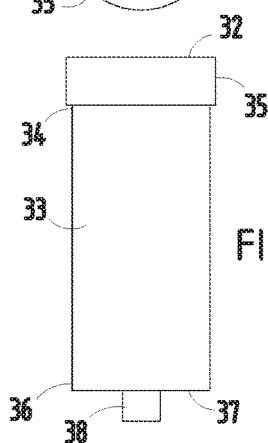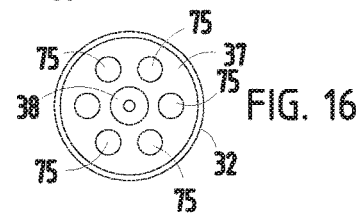

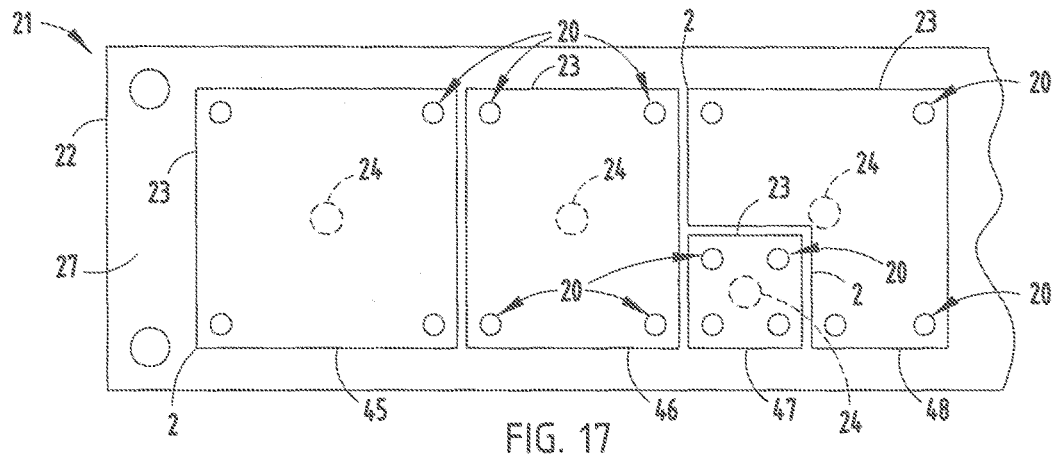
FIG. 17
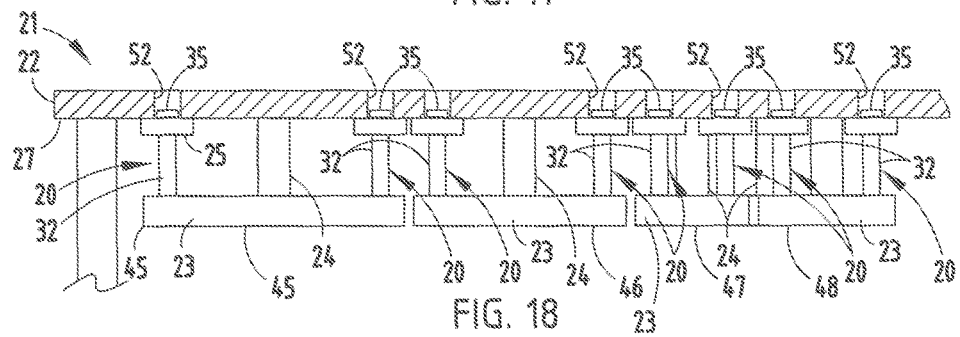
FIG. 18
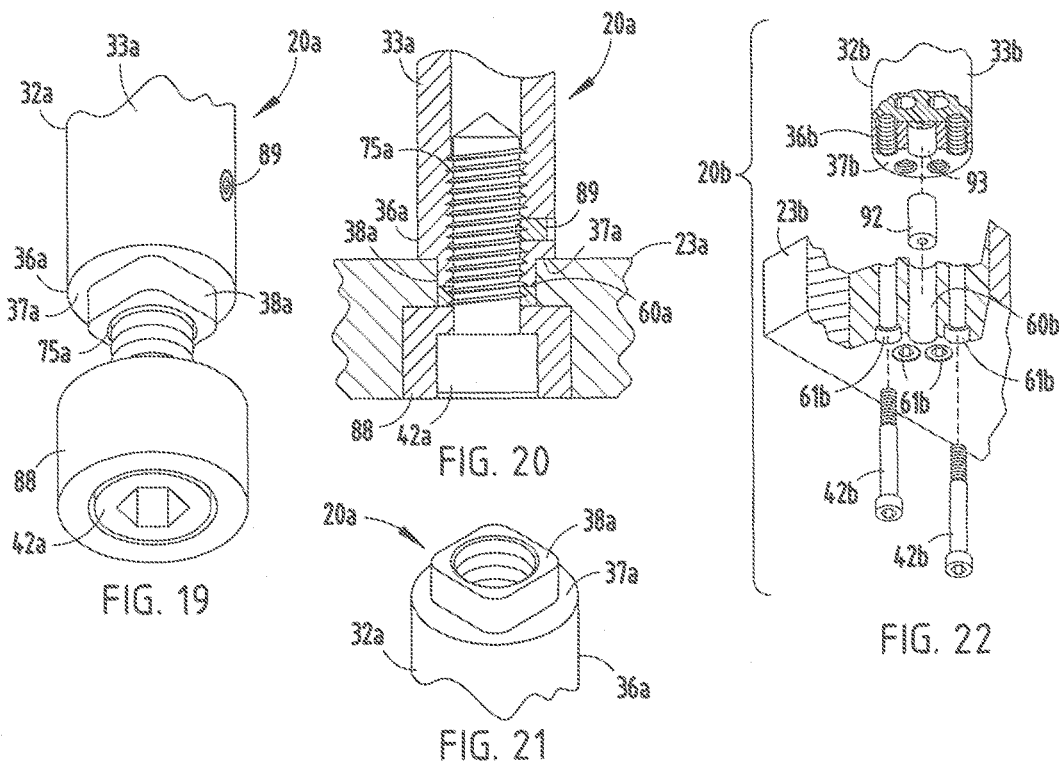
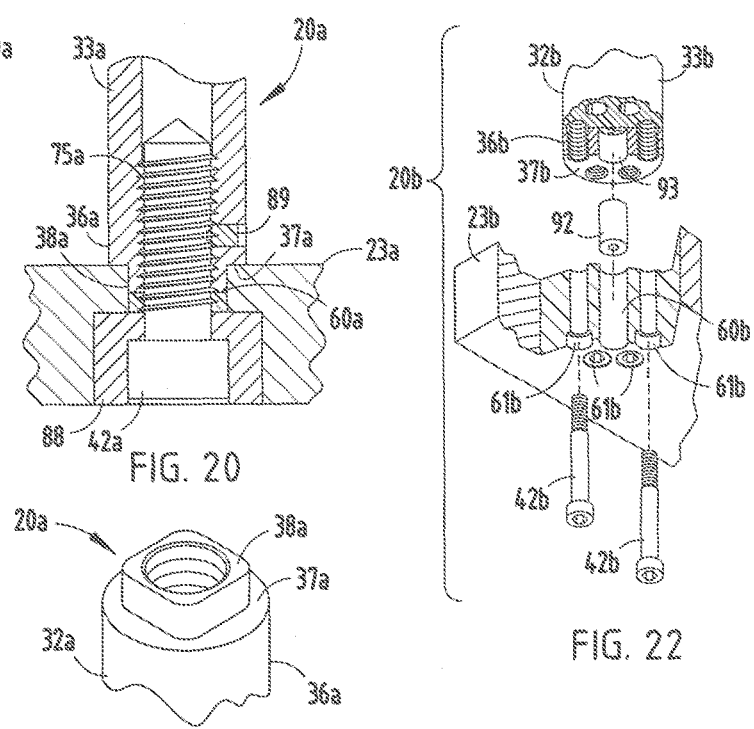
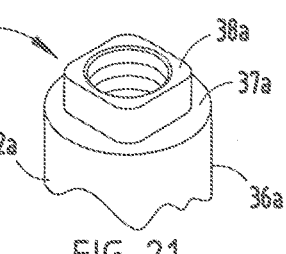
FIG. 19
FIG. 20
FIG. 21
FIG. 22

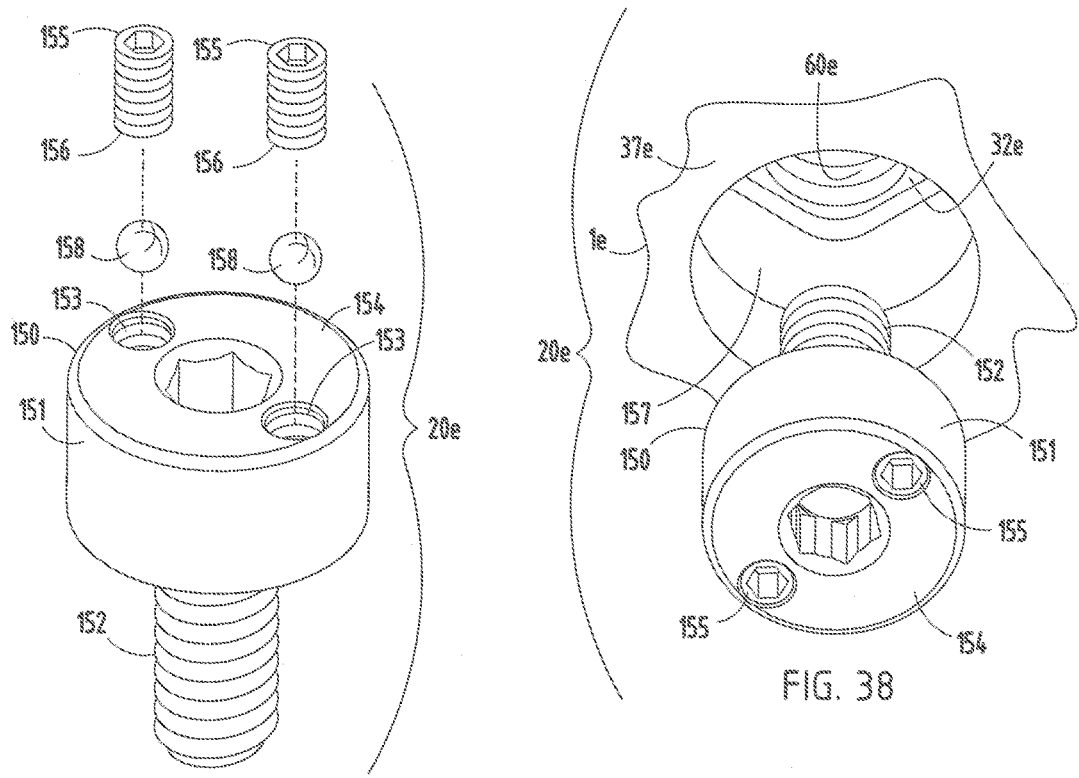
FIG. 37
FIG. 38
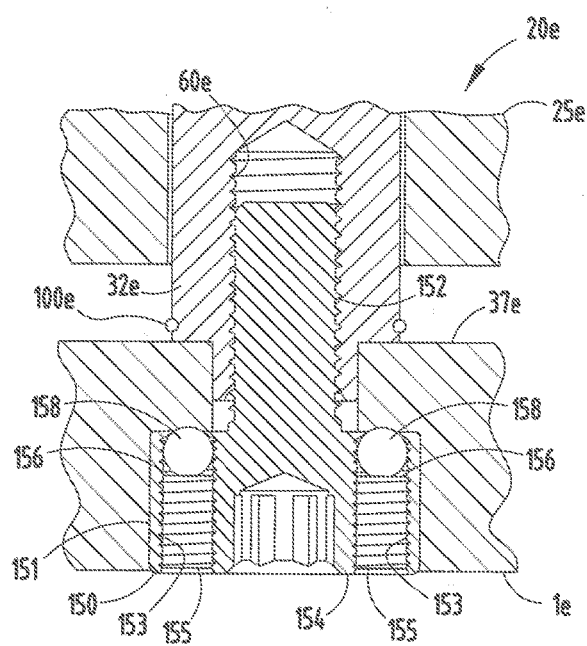
FIG. 39

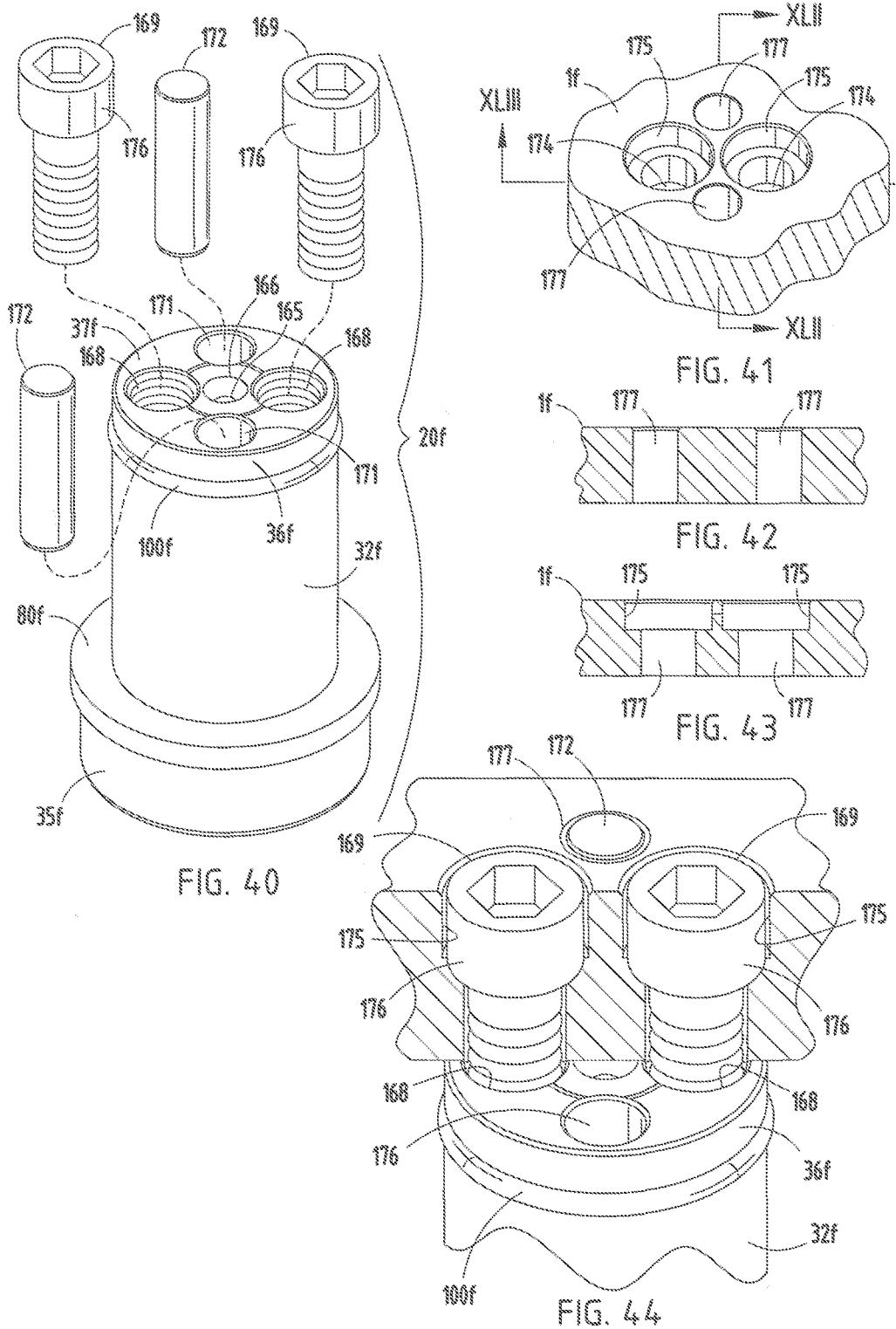

TWO-PIECE GUIDE PIN AND METHOD

CROSS REFERENCE TO RELATED APPLICATION

Applicants hereby claim the priority benefits under the provisions of 35 U.S.C. § 119, basing said claim of priority on related U.S. application Ser. No. 14/085,968 filed Nov. 21, 2013, now U.S. Pat. No. 9,259,809, issued Feb. 16, 2016, which claimed priority to commonly assigned U.S. application Ser. No. 12/792,240 filed Jun. 2, 2010, now U.S. Pat. No. 8,616,038, issued Dec. 31, 2013, both of which are hereby incorporated herein by reference.

BACKGROUND OF THE INVENTION

The present invention relates to metal forming dies and the like, and in particular to a two-piece guide pin and associated method.

Metal forming dies, such as stamping dies and the like, are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds, so as to minimize manufacturing costs.

Heretofore, the dies used in metal forming presses have typically been individually designed, one-of-a-kind assemblies for a particular part, with each of the various components being handcrafted and custom mounted or fitted in an associated die set, which is in turn positioned in a stamping press. Not only are the punches and the other forming tools in the die set individually designed and constructed, but the other parts of the die set, such as stock lifters, guides, end caps and keepers, cam returns, etc., are also custom designed, and installed in the die set. Current die making processes require carefully machined, precision holes and recesses in the die set for mounting the individual components, such that the same are quite labor intensive, and require substantial lead time to make, test and set up in a stamping press. Consequently, such metal forming dies are very expensive to design, manufacture and repair or modify.

FIGS. 4 and 5 illustrate a prior art metal forming die that includes a die shoe 1 and a die pad 2, which are interconnected for mutual reciprocation by a plurality of spools 3. A spring mechanism 4 is mounted between die shoe 1 and die pad 2, and resiliently urges die pad 2 to a fully extended position. A metal forming die 5 is mounted on the outer surface of die pad 2. Each of the spools 3 includes an enlarged head 6 which reciprocates in an associated counter bore 7 in the bottom of die shoe 1. The heads 6 of spools 3 engage the top of the associated counter bores 7 to positively retain die pad 2 in its fully extended position. The other ends 8 of spools 3 are attached to the corners of die pad 2. While such constructions have been generally successful, they do not precisely control reciprocation between die pad 2 and die shoe 1, particularly in high speed, progressive die applications.

FIGS. 6 and 7 illustrate another prior art configuration, wherein pressed in pins 10, with locator bushings 11, have been added to the spools 3 shown in FIG. 1 to more precisely control the reciprocation between die pad 2 and die shoe 1.

FIGS. 8 and 9 illustrate yet another prior art configuration, which includes guide pins 10 and bushings 11, but substitutes footed keepers 13 and 14 for the common spools 3 to positively limit the reciprocation between die pad 2 and die shoe 1. More specifically, footed keepers 13 are mounted to die pad 2, and engage mating footed keepers 14 which are mounted on die shoe 1.

FIGS. 45-49 illustrate a prior art, integrally formed, one-piece guide pin 180 and associated method, which is somewhat similar to previously described guide pin 32, insofar as it has a generally cylindrical shaped body portion 181, with an alignment member 182 formed integrally at one end of guide pin body 181, and an enlarged head 183 formed integrally at the opposite end of guide pin body 181. As best illustrated in FIGS. 46-49, one-piece guide pin 180 is integrally formed from a solid bar 184 of hardenable steel having a cylindrical shape with an oversized outside diameter that is substantially commensurate with the outside diameter of the enlarged head 183. The cut length of the oversized bar 184 is determined in accordance with the desired height of the one-piece guide pin 180. The cut length of oversized bar stock 184 is precision machined, as shown in FIG. 47, to create the integral body 181 and head 183. Since the guide pin body reciprocates in an associated die bore for precisely guiding reciprocal motion between an associated die pad and die shoe, the exterior surface thereof must be hard and very accurate in shape and size to achieve the necessary low friction bearing and precision guide functions. The alignment member 182 is formed on that end of the one-piece guide pin 180 disposed opposite integrally formed head 183. Next, the precision machined guide pin 180 must be heat treated through nitride hardening or the like, as shown in FIG. 48. Because the nitride hardening process roughens the outside surface of the one-piece guide pin 180, at least the body portion 181 thereof must then be individually polished to facilitate close reception and sliding reciprocation in the associated die member bore. While one-piece guide pin 180 and the associated method are generally effective, the same are complicated and rather expensive. More specifically, the machining of the oversized bar material 184 requires holding a very tight tolerance on the machined guide pin body diameter. Substantial waste of material is also experienced during the machining process, since the guide pin 181 is typically much longer than the guide pin head 183. The formed part then needs to be transported to a specialty processor to be nitrated or the like to harden the outer surface of the guide pin body 181. The nitride process leaves a gray film on the entire surface of the guide pin 180, which requires a secondary polishing process by hand or otherwise. As a result, the lead time needed to produce one-piece guide pin 180 is relatively high, because of the heat treatment process after the part is machined, thereby requiring retailers to inventory substantial quantities of differently sized guide pins to meet customer demands. Furthermore, the required hand polishing adds significant time and cost to the manufacture of the one-piece guide pin 180. Hence, a guide pin construction and associated method which simplify the manufacturing process, reduce lead time and inventories, and reduce costs, as well as improve performance, would clearly be advantageous.

SUMMARY OF THE INVENTION

One aspect of the present invention is a method for making a two-piece guide pin for metal forming dies, comprising the step of selecting an elongate, solid bar of steel guide pin body stock with a cylindrical shape and a hard and smooth finished exterior surface having a predetermined outside diameter selected for close reception in an associated die member bore for precisely guiding reciprocal motion between a die pad and an associated die shoe. The method also includes the steps of cutting a preselected length of the bar of guide pin body stock to define a guide pin body having first and second ends, and forming an alignment member on the first end of the guide pin body to precisely locate the first end of the guide pin on an associated die plate. The method further includes the step of forming an external thread on the guide pin body at a location adjacent to the second end thereof. The process also includes the steps of selecting an elongate, solid bar of guide pin head stock having a predetermined outside diameter that is substantially greater than the outside diameter of the bar of guide pin body stock, and cutting a preselected length of the bar of guide pin head stock to define a guide pin head. The process also includes the steps of forming a recess with a cylindrically-shaped sidewall in an interior face of the guide pin head that is sized to receive therein the second end of the guide pin body, and forming at least one radially oriented aperture through the sidewall of the guide pin head which communicates with the recess therein. The process also includes the steps of forming an internal thread in the sidewall of the recess in the guide pin head which mates with the external thread on the second end of the guide pin body, and screwing the externally threaded second end of the guide pin body into the internally threaded recess in the guide pin head to threadedly connect the guide pin head with the guide pin body. The process also includes the step of driving a tool through the radial aperture in the guide pin head against the adjacent portion of the external thread on the second end of the guide pin body to upset the same and thereby permanently interconnect the guide pin body and the guide pin head to define an enlarged head that serves to positively limit travel between the die shoe and the die pad.

Another aspect of the present invention is a method for making a metal forming die of the type having a die shoe, a die pad mounted a spaced apart distance from the die shoe for mutual reciprocation between converged and diverged positions, and a biasing member disposed between the die shoe and the die pad for biasing the same to the diverged position. The method includes the step of forming a base with a mounting face shaped to abut an adjacent face of the die shoe, at least one connector portion for detachably mounting the base to the die shoe, and a central aperture extending axially through the central portion of the base. The method also includes the step of forming a guide pin with a cylindrically-shaped center portion shaped for close reception in the central aperture of the base, a first end with an enlarged head shaped to abut the base block to positively limit travel between the die shoe and the die pad, and a second end with an alignment member to precisely locate the second end of the guide pin on the die pad. The guide pin forming steps include selecting an elongate, solid bar of steel guide pin body stock with a cylindrical shape and a hard and smooth finished exterior surface having a predetermined outside diameter selected for close reception in the center aperture of the base, and cutting a preselected length of the bar of guide pin body stock to define a guide pin body having first and second ends. The method further includes the steps of selecting an elongate, solid bar of guide pin head stock having a predetermined outside diameter that is substantially greater than the outside diameter of the bar of guide pin body stock, and cutting a preselected length of the bar of guide pin head stock to define a guide pin head. The method further includes the step of rigidly connecting the guide pin head with the second end of the guide pin body in a generally concentric relationship to define the enlarged head that serves to positively limit travel between the die shoe and the die pad. The method also includes the steps of forming at least one fastener aperture in the die shoe at a preselected location, and inserting the central portion of the guide pin body into the central aperture in the base for precisely guiding reciprocal motion between the die pad and the die shoe. The method further includes the steps of engaging a fastener with the connector portion of the base, engaging the same in the fastener aperture in the die shoe to securely, yet detachably, mount the base on the die shoe, engaging the alignment member on the second end of the guide pin with the die pad to precisely locate the second end of the guide pin in the die pad, and securely, yet detachably, and connecting the second end of the guide pin body with the die pad.

Yet another aspect of the present invention is method for making a two-piece guide pin for metal forming dies, comprising the steps of selecting an elongate, solid bar of steel guide pin body stock with a cylindrical shape and a hard and smooth finished exterior surface having a predetermined outside diameter selected for close reception in an associated die member bore for precisely guiding reciprocal motion between a die pad and an associated die shoe. The method also includes the steps of cutting a preselected length of the bar of guide pin body stock to define a guide pin body having first and second ends, and forming an alignment member on the first end of the guide pin body to precisely locate the first end of the guide pin on an associated die plate. The method also includes the steps of selecting an elongate, solid bar of guide pin head stock having a predetermined outside diameter that is substantially greater than the outside diameter of the bar of guide pin body stock, and cutting a preselected length of the bar of guide pin head stock to define a guide pin head. The method also includes the step of rigidly connecting the guide pin head with the second end of the guide pin body in a generally concentric relationship to define an enlarged head that serves to positively limit travel between the die shoe and the die pad.

Yet another aspect of the present invention is a two-piece guide pin for metal forming dies, comprising a guide pin body having first and second ends, and being formed from a cut length of an elongate, solid bar of steel guide pin body stock having a cylindrical shape and a hard and smooth finished exterior surface having a predetermined outside diameter selected for close reception in an associated die member bore for precisely guiding reciprocal motion between a die pad and an associated die shoe. An alignment member is formed on a first end of the guide pin body to precisely locate the first end of the guide pin on an associated die plate. A guide pin head is formed from a cut length of the elongate, solid bar of guide pin head stock having a predetermined outside diameter that is substantially greater than the outside diameter of the bar of guide pin body stock. The guide pin head is rigidly connected with the second end of the guide pin body in a generally concentric relationship to define an enlarged head that serves to positively limit travel between the die shoe and the die pad.

Yet another aspect of the present invention is to provide a metal forming die and associated guided keeper assembly that has a relatively small, compact footprint, with a heavy-duty construction that is very durable. The guided keeper assembly has a modular configuration that facilitates economical manufacture, and also simplifies metal forming die constructions to reduce the effort and cost of designing, manufacturing, repairing and/or modifying the same. Machine downtime is also minimized to realize yet additional efficiency. The guided keeper assembly is efficient in use, economical to manufacture, capable of a long operating life, and particularly well adapted for the proposed use.

Yet another aspect of the present invention is to provide a two-piece guide pin and associated method that is economical to manufacture, efficient in use, and particularly adapted for the proposed use.

These and other advantages of the invention will be further understood and appreciated by those skilled in the art by reference to the following written specification, claims and appended drawings.

BRIEF DESCRIPTION OF THE DRAWINGS

FIG. 1 is a perspective view of a die shoe and die pad interconnected by four guided keeper assemblies embodying the present invention, wherein portions of the die pad and die shoe have been broken away to reveal internal construction.

FIG. 2 is a side elevational view of one of the guided keeper assemblies embodying the present invention.

FIG. 3 is a bottom perspective view of the guided keeper assembly shown in FIG. 2, wherein a portion thereof has been broken away to reveal internal construction.

FIG. 4 is a partially schematic, plan view of a prior art metal forming die.

FIG. 5 is a side elevational view of the prior art metal forming die shown in FIG. 4.

FIG. 6 is a partially schematic plan view of an alternative prior art metal forming die.

FIG. 7 is a side elevational view of the prior art metal forming die shown in FIG. 6.

FIG. 8 is a partially schematic plan view of yet another alternative prior art metal forming die.

FIG. 9 is a side elevational view of the prior art metal forming die shown in FIG. 8.

FIG. 10 is an exploded perspective view of the guided keeper assembly shown with associated fragmentary portions of the die shoe and die pad.

FIG. 11 is a top plan view of a base block portion of the guided keeper assembly.

FIG. 12 is a vertical cross-sectional view of the base block taken along the line XII-XII, FIG. 11.

FIG. 13 is a bottom plan view of the base block.

FIG. 14 is a top plan view of a guide pin portion of the guided keeper assembly.

FIG. 15 is a side elevational view of the guide pin.

FIG. 16 is a bottom plan view of the guide pin.

FIG. 17 is a partially schematic plan view of a metal forming die having a plurality of stations each with die pads connected to the die shoe by the guided keeper assemblies.

FIG. 18 is a partially schematic side elevational view of the metal forming die shown in FIG. 17.

FIG. 19 is a fragmentary, perspective view of a second embodiment of the present invention.

FIG. 20 is a fragmentary, vertical cross-sectional view of the guided keeper assembly shown in FIG. 19, illustrated attached to a die pad.

FIG. 21 is a fragmentary, top perspective view of a guide pin portion of the guided keeper assembly shown in FIGS. 19 and 20.

FIG. 22 is an exploded side elevational view of a third embodiment of the present invention having an alignment pin connecting the guide pin with the die pad.

FIG. 37 is an exploded perspective view of a sixth embodiment of the present invention having an anti-rotating bolt.

FIG. 38 is a perspective view of the guided keeper assembly shown in FIG. 37, illustrated being connected with an associated guide pin.

FIG. 39 is a cross-sectional view of the guided keeper assembly shown in FIGS. 37 and 38, illustrated in an installed position.

FIG. 40 is a perspective view of a seventh embodiment of the present invention having dowel pin locators.

FIG. 41 is a fragmentary perspective view of a die pad which has been drilled to accept the guided keeper assembly shown in FIG. 40.

FIG. 42 is a cross-sectional view of the die pad taken along the line XLII-XLII, FIG. 41.

FIG. 43 is a cross-sectional view of the die pad taken along the line XLIII-XLIII, FIG. 41.

FIG. 44 is a perspective view of the guided keeper assembly shown in FIG. 40, illustrated installed in the die pad.

DETAILED DESCRIPTION OF THE PREFERRED EMBODIMENTS

Figure 50:
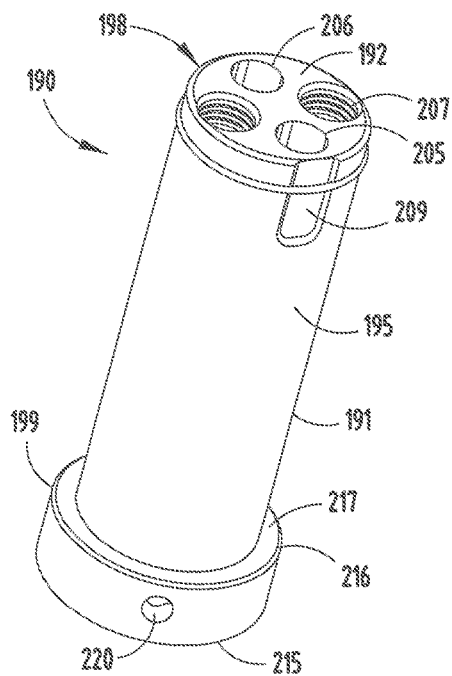
FIG. 50 is a perspective view of a two-piece guide pin embodying the present invention.
Figure 51:
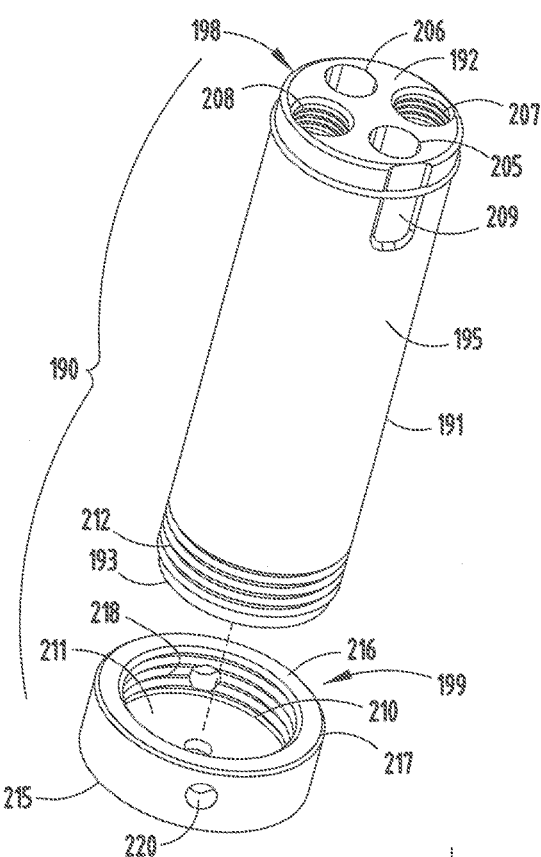
FIG. 51 is an exploded perspective view of the two-piece guide pin.

For purposes of description herein, the terms "upper," "lower," "right," "left," "rear," "front," "vertical," "horizontal," and derivatives thereof shall relate to the invention as oriented in FIG. 50. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 20 (FIGS. 1-3) generally designates a guided keeper assembly embodying the present invention, which is particularly adapted for use in conjunction with metal forming dies, such as the die set or die 21 illustrated in FIG. 1, having a die shoe 22 and a die pad 23 mounted a spaced apart distance from die shoe 22 for reciprocation between converged and diverged positions. A biasing member 24, which is schematically illustrated in FIGS. 17 and 18, is disposed between die shoe 22 and die pad 23 for biasing the same to the diverged position. Guided keeper assembly 20 (FIGS. 1-3) includes a base block 25 having a generally flat mounting face 26 abutting an adjacent face 27 of die shoe 22. Base block 25 has at least one non-threaded fastener aperture 28 extending axially through a marginal portion of base block 25 for detachably mounting base block 25 to die shoe 22. Base block 25 also includes a central aperture 29 extending axially through a central portion of base block 25, and a bushing 30 mounted in the central aperture 29 of base block 25. Guided keeper assembly 20 also includes a guide pin 32 having a cylindrically-shaped central portion 33 closely received in bushing 30 in base block 25 for precisely guiding reciprocal motion between die pad 23 and die shoe 22. Guide pin 32 also includes a first end 34 having an enlarged head 35 shaped to abut the mounting face 26 of base block 25 to positively limit travel between die shoe 22 and die pad 23. Guide pin 32 also includes a second end 36, positioned opposite the first end 34, and having a shoulder 37 with a rigid center post 38 protruding outwardly therefrom to precisely locate the second end 36 of guide pin 32 in die pad 23. A first fastener 40 extends through the fastener aperture 28 in base block 25 and securely, yet detachably, connects base block 25 with die shoe 22. A second fastener 42 securely, yet detachably, connects the second end 36 of guide pin 32 with die pad 23.

In the example illustrated in FIGS. 17 and 18, die 21 is an upper die half, and includes four separate stations 45-48, each having a separate die pad 23 attached to a common upper die shoe 22 by a plurality of guided keeper assemblies 20. In the illustrated example, each of the die pads 23 is attached to the common die shoe 22 by four guided keeper assemblies 20 disposed adjacent corner portions of the die pads 23. However, it is to be understood that the precise number of guided keeper assemblies and their particular location on the die pad 23 will vary in accordance with the particular application. Also, guided keeper assemblies 20 can be used on the lower die shoe, and other similar applications, as will be apparent to those skilled in the art.

As best illustrated in FIG. 10, at each position or location the guided keeper assembly 20 is to be installed, die shoe 22 is prepared in the following manner. A circular clearance or through hole 52 is formed through die shoe 22 in vertical axial alignment with the position at which the guided keeper assembly 20 is to be installed. Through hole 52 has a diameter slightly larger than the head 35 of guide pin 32 to permit free reciprocation of guide pin 32 therein. The formation of through hole 52 is relatively simple, since it can be formed in a single boring operation, and need not be precise, since there is substantial clearance between the head 35 of guide pin 32 and the interior of through hole 52.

In the example illustrated in FIG. 10, four threaded fastener apertures 53 are formed in the surface 27 of die shoe 22, and are arranged around through hole 52 in a quadrilateral pattern for purposes to be described in greater detail hereinafter. Also, in the embodiment illustrated in FIG. 10, two locator apertures 54 are formed in the surface 27 of die shoe 22 on opposite sides of through hole 52 to precisely locate base block 25 on die shoe 22 in the manner described in greater detail hereinafter. Preferably, locator apertures 54 are reamed to provide improved precision.

In the arrangement illustrated in FIG. 10, die pad 23 is prepared in the following manner. A precision circular locator aperture 60 is formed through die pad 23 at a position in vertical alignment with the location at which the guided keeper assembly 20 is to be installed. Locator aperture 60 is a through hole, and is formed with a precise diameter shaped through reaming or the like, to closely receive the center post 38 of guide pin 32 therein to accurately locate the second end 36 of guide pin 32 on die pad 23. In the illustrated example, six non-threaded fastener apertures 61 are formed through die pad 23, and are arranged in a circumferentially spaced apart pattern that is concentric with the locator aperture 60. Fastener apertures 61 have enlarged outer ends to receive the heads of fasteners 42 therein, and serve to securely, yet detachably, mount the second end 36 of guide pin 32 to die pad 23 in a manner described in greater detail hereinafter.

The illustrated base block 25 (FIGS. 10-13) is made from steel, and has a generally rectangular plan configuration defined by an upper surface 26, a lower surface 66 and sidewalls 67-70 which intersect at radiused corners 71. The illustrated base block 25 includes four non threaded fastener apertures 28 positioned adjacent each of the corners 71 of base block 25. Fastener apertures 28 are mutually parallel and are arranged in a rectangular pattern identical to that of the threaded fastener apertures 53 on die shoe 22, such that fastener apertures 28 are in vertical alignment with threaded fastener apertures 53. The lower or die pad ends of fastener apertures 28 have enlarged counter bored portions 72 to receive therein the heads of fasteners 40. The illustrated base block 25 also includes two locator apertures 73 which are formed through base block 25 and are arranged in a mutually parallel relationship for vertical alignment with the locator apertures 54 in die shoe 22. The illustrated base block 25 has a relatively small, compact plan configuration to facilitate die manufacture, and also permits the same to be pocketed or recessed into the die shoe 22, if necessary, for a specific application.

The illustrated bushing 30 (FIG. 10) is a maintenance-free split bushing, constructed from a suitable antifriction material, such as bronze, steel alloys or the like. In the uninstalled condition, the outside diameter of bushing 30 is slightly larger than the interior diameter of central aperture 29, such that bushing 30 is press fit into the central aperture 29 of base block 25 and is securely retained therein by a friction fit. The inside diameter of bushing 30 is slightly greater than the outside diameter of the central portion 33 of guide pin 32, such as 0.0010-0.0020 inches, to accommodate for thermal expansion between the guide pin 32 and the bushing 30, yet maintain precise reciprocal alignment between die shoe 22 and die pad 23. The use of a separate bushing 30 permits base block 25 to be made from high strength steel and the like, thereby providing a much stronger assembly than those constructed from a single, softer material, such as bonze or the like.

As will be appreciated by those skilled in the art, bushing 30 may be formed integrally into base block 25, or omitted entirely by forming the bearing or guide surface for guide pin 32 in base block 25. For example, base block 25 could be constructed from bronze, or other similar antifriction materials, such that central aperture 29 itself forms the guide surface. Alternatively, the central aperture 29 of base block 25 can be plated or otherwise coated with an antifriction material to eliminate the need for a separate bushing 30.

The illustrated guide pin 32 (FIGS. 10 and 14-16) has a generally cylindrical shape, which in the orientation illustrated in FIGS. 14-16, has enlarged head 35 attached to the upper or first end 34 of guide pin 32 and center post 38 protruding downwardly from the lower or second end 36 of guide pin 32. The illustrated shoulder 37 and center post 34 are formed integrally in the lower end 36 of guide pin 32, and center post 37 is precisely located at the center of shoulder 37 in a concentric relationship. The lowermost end of the illustrated center post 38 is flat with a circular indentation at the center which facilitates precise location and formation of center post 38 on guide pin 32. The illustrated center post 38 is accurately machined to a tolerance of 0.0-0.0005 inches. In the example illustrated in FIGS. 10 and 14-16, six threaded fastener apertures 75 are formed in the flat, radially extending shoulder 37 of guide pin 32 in a circumferentially spaced apart pattern that is concentric with center post 38. Threaded fastener apertures 75 are positioned to align vertically with the six non-threaded fastener apertures 61 and die pad 23. In one working embodiment of the present invention, guide pin 32 is constructed from pre hardened 4140 steel, or the like, is cut to length and formed, and then case hardened and polished.

With reference to FIG. 10, the illustrated guided keeper assembly 20 includes an annularly-shaped, resilient washer or ring 80 that is disposed on guide pin 32 between enlarged head 35 and the mounting face 26 of base block 25. Resilient washer 80 serves to absorb impact between head 35 and base block 25 during operation, and can be constructed from urethane, or the like.

In operation, guided keeper assemblies 20 are used to quickly and easily interconnect die shoe 1 and die pad 2 for reciprocation between converged and diverged positions. At least two guided keeper assemblies 20 are typically used to mount die pad 23 to die shoe 22. However, it is to be understood that the specific number of guided keeper assemblies 20 used depends upon the specific die application. In any event, the die shoe 1 is prepared in the manner described hereinabove by providing the clearance or through hole 52, four threaded fastener apertures 53 and two locator apertures 54 at each location at which guided keeper assembly 20 is to be installed. Similarly, die pad 2 is prepared by forming one locator aperture 60 and six unthreaded fastener apertures 61 at each location guided keeper assembly 20 is to be installed. The base blocks 25 are then mounted to the surface 27 of die shoe 22 at each of the designated locations by installed threaded fasteners 40 which are then inserted through fastener apertures 28 and anchored in the threaded fastener apertures 53 in die shoe 22. The illustrated fasteners 40 are cap screws with nylon pellets which resist inadvertent loosening in die shoe 22. Alignment dowels or pins 85 may be mounted in die shoe 22 and received in locator apertures 54 and 73 to achieve additional precision in locating base blocks 25 on die shoe 22. Guide pins 32, with resilient washers 80 installed thereon, are then inserted through the bushings 30 in each of the base blocks 25. The center post 38 at the lower end 36 of each guide pin 32 is received closely within the locator apertures 60 in die pad 23. Threaded fasteners 42 are then inserted through the fastener apertures 61 in die pad 23 and anchored in the threaded fastener apertures 75 in the shoulder portion 37 of guide pin 32 to securely, yet detachably, connect the lower end of guide pin 32 with die pad 23.

The reference numeral 20*a* (FIGS. 19-21) generally designates another embodiment of the present invention, having a single fastener 42*a* at the shoulder end 36*a* of guided pin 32*a*. Since guided keeper assembly 20*a* is similar to the previously described guided keeper assembly 20, similar parts appearing in FIGS. 20-21, 1-3 and 10-16, respectively, are represented by the same, corresponding reference numerals, except for the suffix "a" in the numerals of the latter. In guided keeper assembly 20*a*, the lower or shoulder end 36*a* of guide pin 32*a* includes a center post 38*a* having a non-circular plan configuration, which is designed to prevent rotation of guide pin 32*a* relative to the associated die pad 23*a*. In the illustrated example, the center post 38*a* of guide pin 32*a* has a generally square plan configuration with radiused or rounded corners. Furthermore, a single threaded fastener aperture 75*a* is formed concentrically through shoulder 37*a* and into guide pin 32*a*, and is adapted to receive therein a single threaded fastener 42*a* along with annularly-shaped cap or locking collar 88. A set screw 89 extends radially through the side of guide pin 32*a* to facilitate removal of base block 25, and positively retain fastener 42*a* in threaded fastener aperture 75*a*. Die pad 23*a* is prepared with a non-circular locator aperture 60*a* to closely receive the center post 38*a* of guide pin 32*a* therein and prevent axial rotation therebetween.

The reference numeral 20*b* (FIG. 22) generally designates yet another embodiment of the present invention having a removable locator pin 92 at the shoulder end 36*b* of guide pin 32*b*. Since guided keeper assembly 20*b* is similar to the previously described guided keeper assembly 20, similar parts appearing in FIG. 22, FIGS. 1-3 and 10-16, respectively, are represented by the same, corresponding reference numerals, except for the suffix "b" in the numerals of the latter. In guided keeper assembly 20b, a cylindrical recess 93 is formed in the end 37b of guide pin 32b, instead of center post 38b. In the illustrated example, recess 93 has a generally circular plan configuration, and is precisely formed in the center of the shoulder 37b of guide pin 32b. A mating through aperture 60b is formed through die pad 23b in vertical alignment with recess 93. A separate, cylindrical locator pin 92 has one end closely received in recess 93, and the opposite end closely received in locator aperture 60b, so as to precisely locate the shoulder end 36b of guide pin 32b in die pad 23b.

Figure 23:
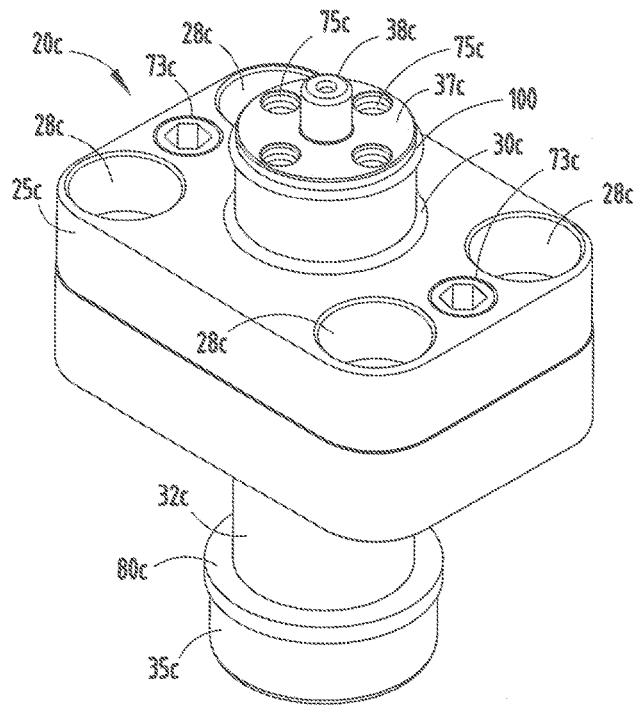
FIG. 23 is a perspective view of a fourth embodiment of the present invention having a retainer ring which retains the base on the guide pin in an assembled condition.
Figure 24:
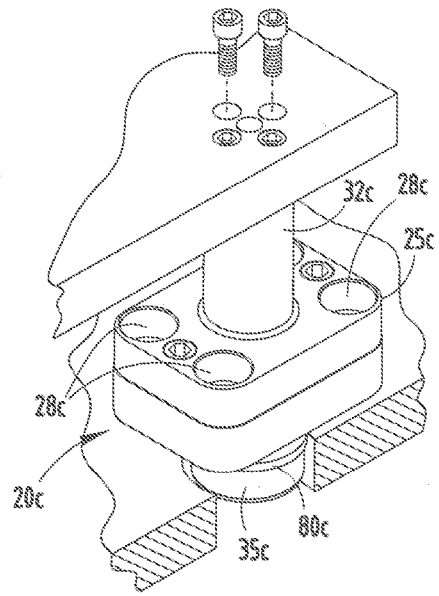
FIG. 24 is a perspective view of the guided keeper assembly shown in FIG. 23, illustrated being attached to an associated die.
Figure 25:
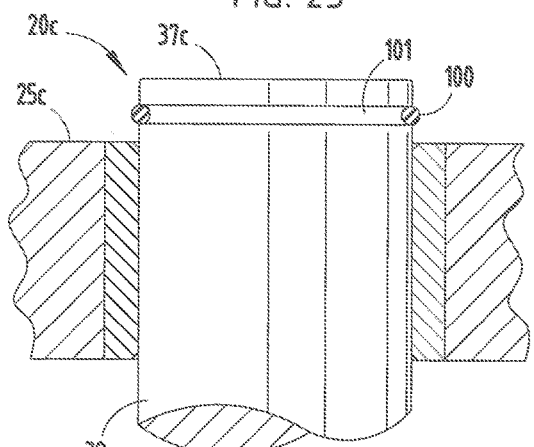
FIG. 25 is an enlarged, fragmentary cross-sectional view of a guide pin portion of the guided keeper assembly shown in FIGS. 23 and 24.
Figure 26:
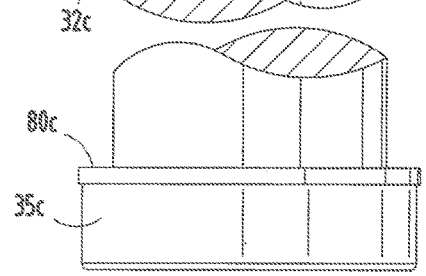
FIG. 26 is a fragmentary cross-sectional view of the guided keeper assembly shown in FIGS. 23-25.
Figure 27:
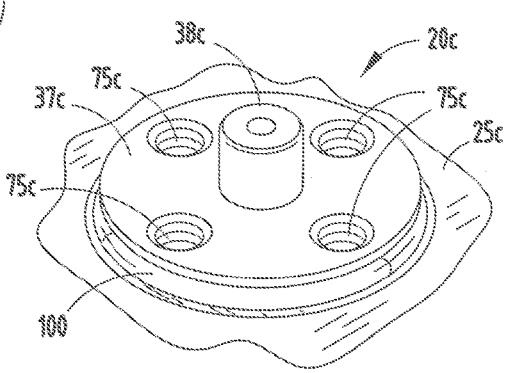
FIG. 27 is an enlarged, fragmentary view of the guided keeper assembly shown in FIGS. 23-26.
Figure 28:
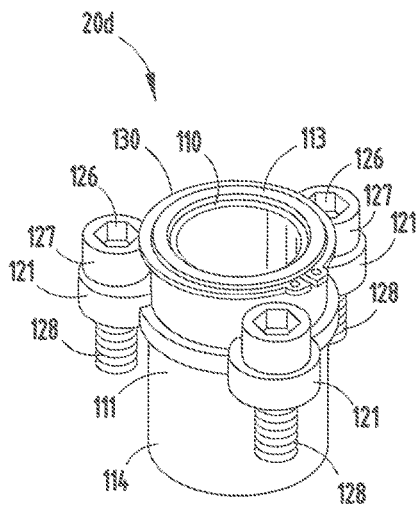
FIG. 28 is a perspective view of a fifth embodiment of the present invention having a base bushing.

The reference numeral 20c (FIGS. 23-27) generally designates yet another embodiment of the present invention having a retainer ring 100 which retains the base 25c on the guide pin 32c between the enlarged head 35c and the retainer ring 100 in an assembled condition to facilitate transport and mounting of the guided keeper assembly 20c. Since guided keeper assembly 20c is similar to the previously described guided keeper assembly 20, similar parts appearing in FIGS. 23-27 and FIGS. 1-18, respectively, are represented by the same, corresponding reference numerals, except for the suffix "c" in the numerals of the latter. In guided keeper assembly 20c, a radially outwardly opening groove 101 extends circumferentially about the second end 36c of guide pin 32c. As best illustrated in FIG. 25, groove 101 has a generally U-shaped configuration, and is positioned axially immediately adjacent to the flat shoulder 37c on guide pin 32c to avoid interfering with the reciprocation of die pad 2c. Retainer ring 100 is removably mounted in groove 101 and protrudes radially outwardly of the second end 36c of guide pin 32c to securely, yet detachably, retain base 25c on guide pin 32c between head 35c and retainer ring 100 in an assembled condition to create a semi-permanent assembly which facilitates transport and mounting of the guided keeper assembly 20c. The base 25c, guide pin 32c and washer 80c can be disassembled only after removal of retainer ring 100 from guide pin grove 101. In the illustrated example, retainer ring 100 comprises a resilient ring sized to selectively snap fit into groove 101. In one example of the present invention, retainer ring 100 is a flexible O-ring that is constructed from a relatively soft material so as to absorb impact with base 25c. As in guided keeper assembly 20, a resilient washer 80c is disposed on guide pin 32c between enlarged head 35c and the mounting face 26c of base 25c to absorb impact therebetween. The illustrated guided keeper assembly 1c has a block-shaped base block 25c, and is mounted to an associated die shoe 1c in a manner similar to that described above relative to guided keeper assembly 20. Guided keeper assembly 20c is particularly beneficial when the same is mounted to a die member in the orientation illustrated in FIG. 24, where the head 35c of guide pin 32c is oriented downwardly, and the alignment end 36c is oriented upwardly. When guide pin 32c is unbolted from die block 1c, O-ring 100 prevents the guide pin 32c from falling through base 25c.

The reference numeral 20d (FIGS. 28-36) generally designates yet another embodiment of the present invention having a bushing style base 110. Since guided keeper assembly 20d is similar to the previously described guided keeper assembly 20, similar parts appearing in FIGS. 28-36 and FIGS. 1-18, respectively, are represented by the same, corresponding reference numerals, except for the suffix "d" in the numerals of the latter. The illustrated base style bushing 110 has a generally annular configuration defined by a cylindrically-shaped outer wall 111, a cylindrically-shaped inner wall 112, an upper end 113 and a lower end 114. An outwardly opening groove 115 extends circumferentially about outer wall 111 at a location thereon adjacent to the upper end 113 of base bushing 110. An annularly-shaped mounting flange 116 protrudes radially outwardly from the outer wall 111 of base bushing 110 at a location thereon between groove 115 and the lower end 114 of base bushing 110, and has a radially extending first face 118 configured to abut the die shoe 1d, and an oppositely oriented, radially extending second face 119. Guided keeper assembly 20d also includes a plurality of heavy-duty flange clamps 121, each of which has a fastener aperture 122 extending through a marginal portion 123 thereof and a radially inwardly projecting lip 124 which abuttingly engages an adjacent portion of the second face 119 of mounting flange 116 for detachably mounting base bushing 110 to die shoe 1d. Flange clamps 121 are preferably designed to exceed the strength of the guide pin connection, and provide a very economical construction. Guided keeper assembly 20d also includes a plurality of substantially identical fasteners 126, such as cap screws, each of which has a head portion 127, as well as a shank portion 128 which extends through the fastener aperture 122 of an associated flange clamp 121 for securely, yet detachably, connecting base bushing 110 with die shoe 1d. Guided keeper assembly 20d also includes a retainer ring 130 which is detachably mounted in the groove 115 in base bushing 110 and protrudes radially outwardly of the outer wall 111 of base bushing 110 to a position immediately above and adjacent to the head portions 127 of fasteners 126 to positively prevent fasteners 126 from being inadvertently removed from engagement with the die shoe 1d. Guided keeper assembly 20d is particularly adapted for use in space restricted areas and applications, because the flange clamps 121 can be readily moved around the circumference of base bushing 110, so as to avoid adjacent blocks and/or die parts.

The illustrated base bushing 110 has a split bushing 30d, similar in construction to bushing 30, which is press fit into the interior thereof against inner wall 112. Furthermore, in the illustrated example, mounting flange 116 is positioned axially nearest to upper end 113, although the location can vary substantially in accordance with the specific application.

Figure 29:
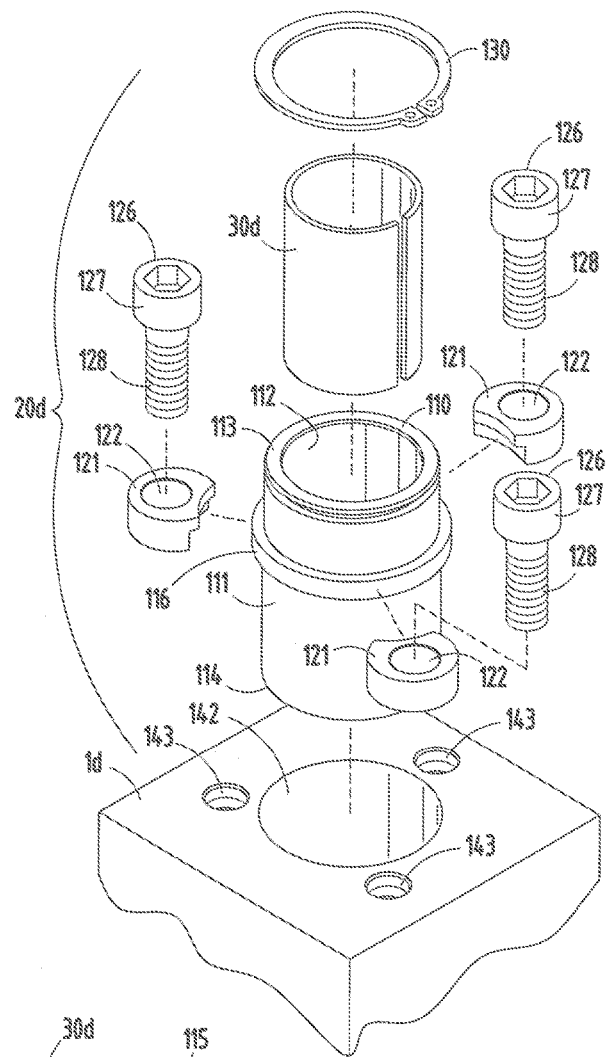
FIG. 29 is an exploded perspective view of the guided keeper assembly shown in FIG. 28.
Figure 30:
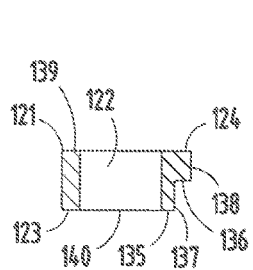
FIG. 30 is a cross-sectional view of a flange clamp portion of the guided keeper assembly shown in FIGS. 28 and 29.
Figure 31:
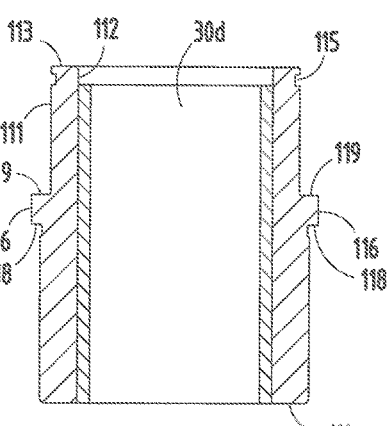
FIG. 31 is a cross-sectional view of a base bushing portion of the guided keeper assembly shown in FIGS. 28-30.
Figure 32:
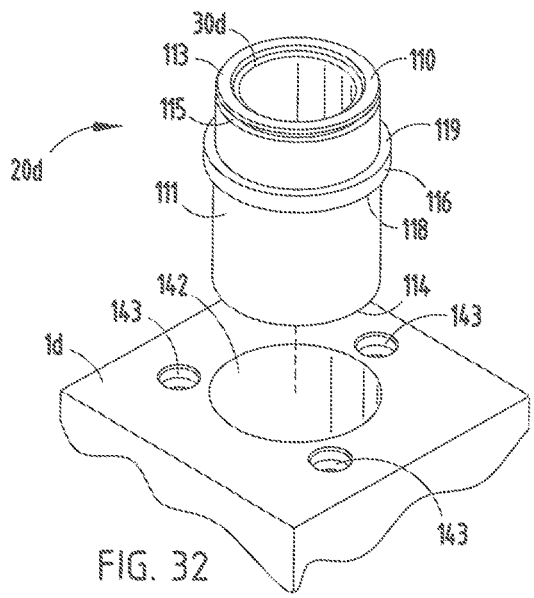
FIG. 32 is a perspective view of the base bushing portion of the guided keeper assembly shown in FIGS. 28-30, illustrated being assembled into an associated die pad.
Figure 33:
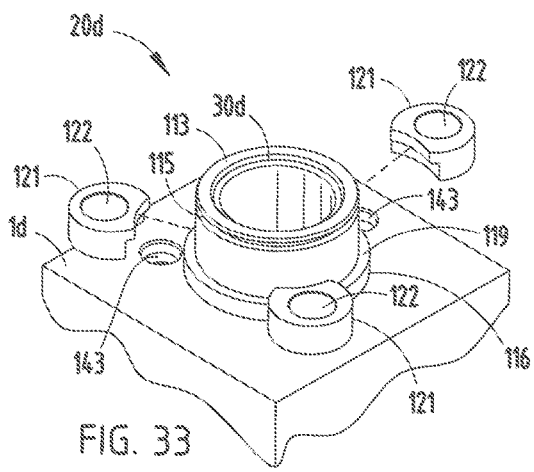
FIG. 33 is a perspective view of the guided keeper assembly shown in FIGS. 28-32, illustrated with the base bushing installed in the die shoe and flange clamps being assembled on the base bushing.

As best illustrated in FIGS. 29 and 33, each of the flange clamps 121 has a substantially identical one-piece construction, comprising a generally circularly-shaped body 135 with fastener aperture 122 extending through the marginal portion 123 of body 135. Lip 124 is formed by a groove 136 in the radially inwardly, lower portion of body 135. As best illustrated in FIGS. 30 and 32-36, the base edge 137 of groove 136 has an arcuate shape similar to the outside diameter of mounting flange 116, while the lip edge 138 has an arcuate shape similar to that of outer wall 111. Body 135 also includes a generally flat upper surface 139 (FIG. 30) against which the head portion 127 of fastener 126 abuts, and a generally flat lower surface 140 disposed generally parallel with upper surface 139, and shaped for abutting contact with the adjacent portion of die shoe 1d.

The illustrated retainer ring 130 is in the nature of a metal, split snap ring, which is sufficiently flexible to facilitate insertion into the groove 115 in base bushing 110, but sufficiently rigid in the axial direction to positively prevent fasteners 126 from becoming dislodged from the associated die shoe 1d.

Figure 34:
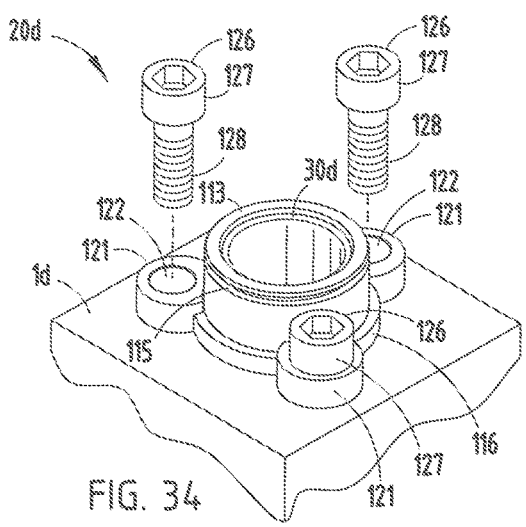
FIG. 34 is a perspective view of the guided keeper assembly shown in FIGS. 28-33, illustrated with threaded fasteners being inserted into the flange clamps.
Figure 35:
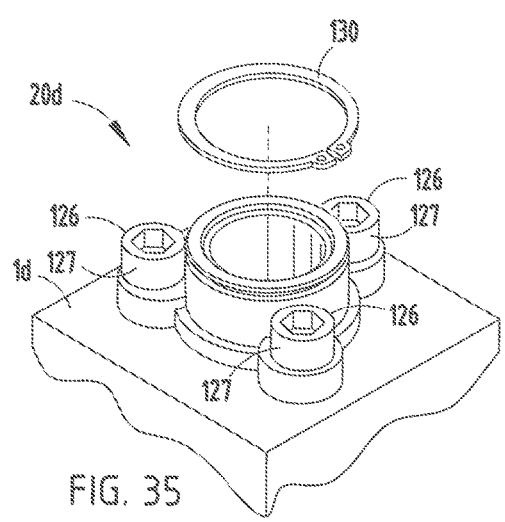
FIG. 35 is a perspective view of the guided keeper assembly shown in FIGS. 28-34, illustrating a retainer ring being assembled on the base bushing mounted in the die shoe.
Figure 36:
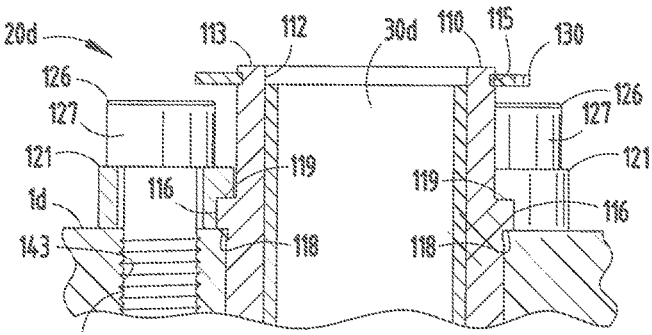
FIG. 36 is a cross-sectional view of the guided keeper assembly shown in FIGS. 28-35 in an assembled condition.
Figure 45:
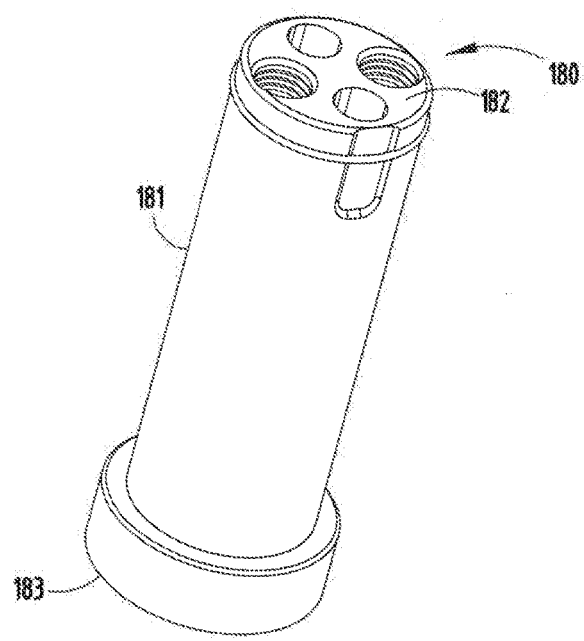
FIG. 45 is a perspective view of a prior art, integrally formed, one-piece guide pin.
Figure 46:
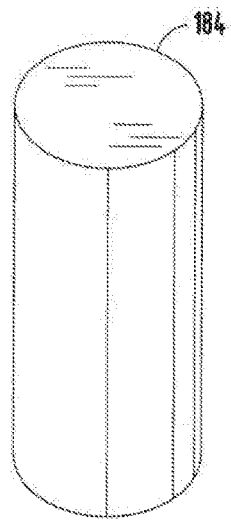
FIGS. 46-49 are perspective views which illustrate the processing steps used to make the one-piece guide pin illustrated in FIG. 45.
Figure 47:
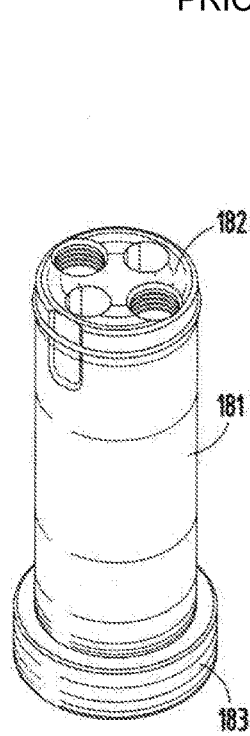
Figure 48:
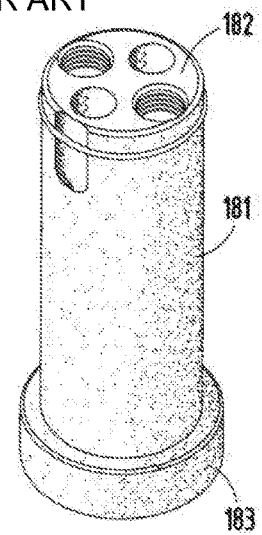
Figure 49:
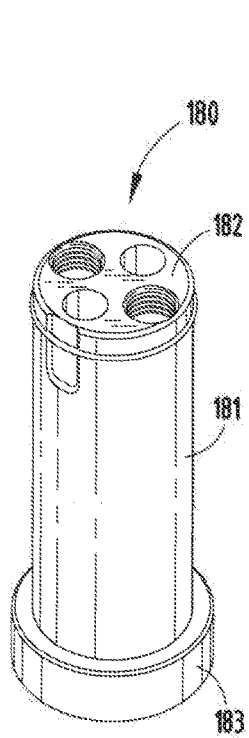

With reference to FIGS. 32-36, guided keeper assembly 20d is installed in an associated die shoe 1d in the following manner. An aperture 142 is precisely formed in the face of an associated die shoe 1*d* at the location desired, as shown in FIG. 32. The diameter of aperture 142 is selected to closely receive therein and abut the outer wall 111 of base bushing 110, so that the body of base bushing 110 locates the assembly in the associated die plate. A plurality of threaded apertures 143 are then formed in dies shoe 1*d* at a spaced apart location from aperture 142, and arranged in a regularly spaced apart circumferential pattern, as shown in FIG. 32. In the illustrated example, three threaded apertures 143 are formed in die shoe 1*d*. Flange clamps 121 are then assembled onto base bushing 110, such that the lip portions 124 of flange clamps 121 engage the first face 118 of mounting flange 116 and the fastener apertures 122 in fastener clamps 121 are aligned with the threaded apertures 143 in die shoe 1*d*, as shown in FIG. 33. Fasteners 126 are then inserted through the fastener apertures 122 in fastener clamps 121, and anchored securely in threaded apertures 143 in die shoe 1*d*, as shown in FIG. 34. Retainer ring 130 is then mounted in the groove 115 in base bushing 110, as shown in FIGS. 35 and 36 to position the same immediately above and adjacent to the head portions 127 of fasteners 126, so as to positively prevent fasteners 126 from being inadvertently removed or dislodged from engagement with the die shoe 1*d*.

The reference numeral 20*e* (FIGS. 37-39) generally designates yet another embodiment of the present invention having an anti-rotate bolt feature. Since guided keeper assembly 20*e* is similar to the previously described guided keeper assembly 20, similar parts appearing in FIGS. 37-39 and FIGS. 1-21, respectively, are represented by the same, corresponding reference numerals, except for the suffix "e" in the numerals of the latter. The illustrated guided keeper assembly 20*e* includes an anti-rotate bolt 150 that is particularly adapted for use in conjunction with the single fastener type of guide pin shown in FIGS. 19-21, and represented by the reference numeral 32*e* in FIGS. 37-39. However, it is to be understood that anti-rotate bolt 150 can also be used in conjunction with the other guided keeper assembly embodiments disclosed herein.

In the illustrated example, anti-lock bolt 150 has a one-piece construction for improved strength, comprising an oversized, cylindrically-shaped head portion 151 and a threaded shank portion 152. The head portion 151 of anti-rotate bolt 150 has a pair of threaded apertures 153 extending axially completely through marginal portion 154 of bolt head portion 151. A pair of set screws 155 are threadedly mounted in the threaded apertures 153 in the head portion 151 of anti-rotate bolt 150, and include interior free ends 156 which serve to engage the recess 157 in the die shoe 1*e* to prevent inadvertent loosening of anti-rotate bolt 150. In the illustrated example, hardened metal, spherically-shaped balls 158 are positioned in the axial apertures 153 in bolt head portion 151, between the recess 157 in die shoe 1*e* and the free ends 156 of set screws 155. Tightening of set screws 155 urges balls 158 into abutting engagement with the adjacent surfaces of recess 157, so as to form detents therein which serve to prevent inadvertent loosening of anti-rotate bolt 150.

FIGS. 38 and 39 illustrate the mounting of anti-rotate bolt 150 in an associated guide pin 32*e*, which is of the type having a non-circular shoulder 37*e* with center post 38*e* received in and against the similarly shaped non-circular aperture in die pad 2*e*. Preferably, the locking of anti-rotate bolt 150 is accomplished from the working side of die pad 2*e* for ease of assembly. Hardened balls 158 are inserted into the threaded apertures 153 in bolt head 151, and set screws 155 are threaded into apertures 153 in a loosened condition.

The threaded shank portion 152 of anti-rotate bolt 150 is then threaded into the associated threaded aperture 60*e* in the second end 36*e* of guide pin 32*e* and tightened. Next, set screws 155 are then tightened, forcing balls 158 into engagement with the adjacent surfaces of recess 157 and forming detents or recesses therein, so as to prevent inadvertent loosening of anti-rotate bolt 150, as shown in FIG. 37. If anti-rotate bolt 150 is forced loose before the set screws 155 are loosened, such as by using a wrench, balls 158 push the interfering material away, but damage to the anti-rotate bolt assembly is avoided.

The reference numeral 20*f* (FIGS. 40-44) generally designate another embodiment of the present invention, having a combination bolt and dowel guide pin connection. Since guided keeper assembly 20*f* is similar to the previously described guided keeper assembly 20, similar parts appearing in FIGS. 40-44 and FIGS. 1-18, respectively, are represented by the same, corresponding reference numerals, except for the suffix "f" in the numerals of the latter. The illustrated guided keeper assembly 20*f* has a combination bolt/dowel guide pin connection. More specifically, instead of the center post 38 type of guide pin connection illustrated in FIGS. 1-18, the shoulder 37*f* of guide pin 32*f* is completely flat. The illustrated guide pin 32*f* has a central aperture 165 disposed concentric with the central axis of guide pin 32*f*, and includes an inwardly tapered upper portion 166. The flat shoulder 37*f* of guide pin 32*f* also includes a pair of axially extending threaded apertures 168 positioned in a diametrically opposite relationship at eccentric locations on shoulder 37*f*, spaced a predetermined distance from central aperture 165. Threaded apertures 168 are adapted to threadedly receive therein a pair of threaded bolts 169, as shown in FIGS. 40 and 44. The flat shoulder 37*f* of guide pin 32*f* also includes a pair of axially extending non-threaded apertures 171 which are positioned diametrically opposite one another in a perpendicular relationship with threaded apertures 168 at eccentric locations spaced apart from central aperture 165. Non-threaded apertures 171 are precisely machined and adapted to receive therein a pair of dowel pins 172 which serve to accurately locate the second end 36*f* of guide pin 32*f* on the associated die pad 2*f*.

In operation, guided keeper 20*f* is mounted on an associated die pad 2*f* in the following manner. With reference to FIGS. 41-43, a pair of non-threaded apertures 174 are formed completely through die pad 2*f* at locations thereon vertically aligned with the threaded apertures 168 on guide pin 32*f*. Each aperture 174 has an enlarged upper socket portion 175 in which the head 176 of bolt 169 is received. A pair of non-threaded apertures 177 are also formed through die shoe if in a position vertically aligned with the non-threaded apertures 168 in guide pin 32*f*. Apertures 178 are precisely formed so as to closely receive dowel pins 172 therein. A pair of dowel pins 172 are inserted into the apertures 177 in die shoe 1*f*, as well as the non-threaded apertures 171 in guide pin 32*f*, so as to precisely locate guide pin 32*f* on die pad 2*f*. Next, fasteners 169 are inserted through apertures 174 in die pad 2*f*, and anchored securely in the threaded apertures 168 in guide pin 32*f*, thereby securely retaining guide pin 32*f* in the associated die shoe 1*f*.

While many of the guided keeper assemblies 20-20*f* described and illustrated herein have a base 25 fastened to the die shoe 1 and the guide pin 32 fastened to the die pad, as will be appreciated by those skilled in the art, guided keeper assemblies 20-20*f* can be inverted, and otherwise assume a wide variety of different orientations, such that the associated terms used herein, should not be considered as limiting.

Guided keeper assemblies 20, 20a, 20b, 20c, 20d, 20e and 20f each provide a very effective, versatile, uncomplicated and inexpensive mechanism that both precisely aligns a die shoe with an associated die pad, and positively limits reciprocal travel therebetween.

The reference numeral 190 (FIGS. 50-59) generally designates yet another embodiment of the present invention, having a two-piece guide pin construction. Two-piece guide pin 190 (FIGS. 50-54) includes a guide pin body 191 having first and second ends 192 and 193, and is formed from a cut length of an elongate, solid bar of steel guide pin body stock 194 (FIG. 55) having a cylindrical shape and a hard and smooth finished exterior surface 195 with a predetermined outside diameter selected for close reception in an associated die member bore, such as the central aperture 29 of base block 25, for precisely guiding reciprocal motion between die pad 2 and die shoe 1. An alignment member 198 (FIGS. 50-54) is formed on the first end 192 of guide pin body 191 to precisely locate the first end 192 of the guide pin 190 on an associated die plate. Two-piece guide pin 190 also includes a separate guide pin head 199 formed from a cut length of an associated solid bar 200 of guide pin head stock having a predetermined outside diameter that is substantially greater than the outside diameter of the bar of guide pin body stock 194. The guide pin head 199 is rigidly connected to the second end 193 of the guide pin body 191 in a generally concentric relationship to define an enlarged head that serves to positively limit travel between the die shoe 1 and the die pad 2.

In the illustrated example, guide pin body 199 is made from an elongate, solid bar of steel which has been plated or otherwise coated with a hard and smooth material, such as chrome or the like, thereby creating a mirror-like finish that is particularly adapted to facilitate close, low friction, sliding reception in an associated die member bore for precisely guiding reciprocal motion between the die pad 2 and the die shoe 1. The outside diameter of the guide pin body bar stock 194 is selected to be exactly the same as the finished outside diameter of the guide pin body 191, such that a plurality of guide pin body blanks 196 (FIG. 55) can be cut from a single bar of stock 194, and do not require further surface hardening or hand polishing, as was required in prior art processing. The outside surface 195 of the guide pin body stock 194 may be power polished in a buffing machine or the like, before the bar of stock 194 is cut lengthwise into individual blanks 196. Furthermore, the cutoff step in forming the individual guide pin body blanks 196 does not require high tolerances, and can be made with one setup on a general purpose lathe, since the bar stock 194 does not require machining to a reduced diameter. In the illustrated two-piece guide pin, a small pin-shaped cutoff nub 197 is formed about the axial center of the second end 193 of guide pin body 181 when the cutoff tool reaches the depth at which the thin connection between the blank 196 and the balance of the bar stock 184 breaks under its own weight, along with the dynamics of the cutoff process. Preferably, this cutoff nub 197 is simply left in place on guide pin body 181, so as to avoid the effort, time and expense of removing the same, as described further below. Also, the amount of material waste that is experienced in the manufacture of prior art one-piece guide pins is virtually eliminated.

In the illustrated example, the alignment member 198 comprises two axially extending locator apertures 205 and 206 and two oppositely disposed fastener apertures 207 and 208, which are similar to those shown in FIGS. 40-44, and discussed above. However, it is to be understood that other alignment member constructions, including those disclosed herein, could also be used at the first end 192 of guide pin body 191 to precisely locate the first end of the guide pin on an associated die plate. The illustrated guide pin body 191 also includes a pair of flats 209 disposed in a diametrically opposite relationship adjacent the first end 192 of guide pin body 191 for purposes of facilitating engagement by a tool to retain the guide pin body 191 in place during assembly.

The illustrated guide pin body 191 has an external thread 212 formed on the exterior surface 195 at a location adjacent to the second end 193 of guide pin body 191. In the illustrated example, the threads are relatively deep cut and coarse to facilitate forming a very strong threaded connection with guide pin head 199.

The illustrated guide pin head 199 (FIGS. 50-54) has a generally cylindrical or disk shape, comprising an exterior face 215, an interior face 216 and a sidewall 217. A cup-shaped recess 210 is formed in the interior face 216 of guide pin head 199, and has a circular top plan shape, and a bottom wall 211. An internal thread 218 is formed in the sidewall 217 of the recess 211 in guide pin head 199, which mates with the external thread 212 on the second end 193 of guide pin body 191. The illustrated guide pin head 199 also includes a pair of radially oriented apertures 220 which extend through sidewall 217 and communicate with the recess 211 formed in the exterior face 216, and facilitate permanently attaching the guide pin head to the guide pin body, as disclosed in greater detail hereinafter. In the illustrated example, the bottom wall 211 of guide pin head 199 includes a blind hole 221 disposed about the axial center thereof, which has a width and depth sufficient to wholly receive therein the cutoff nub 197 on the second end 193 of the guide pin body 181. Blind hole 221 permits the guide pin head 199 to be threaded fully onto the second end of guide pin body 191, without removing the cutoff nub 197.

Figure 52:
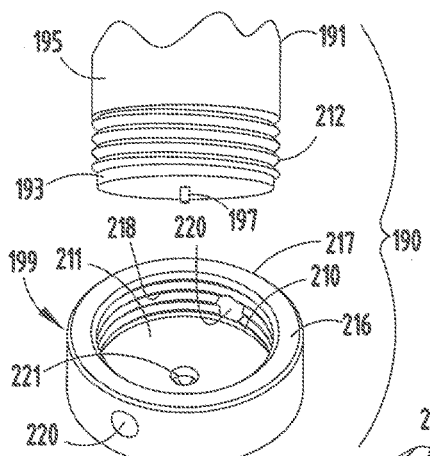
FIG. 52 is an enlarged, fragmentary, exploded perspective view of one end of the two-piece guide pin, shown prior to assembly.
Figure 53:
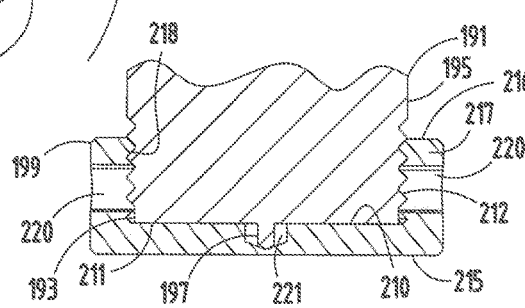
FIG. 53 is an enlarged, fragmentary, cross-sectional view of one end of the two-piece guide pin, showing the guide pin head and the guide pin body in an assembled condition.
Figure 54:
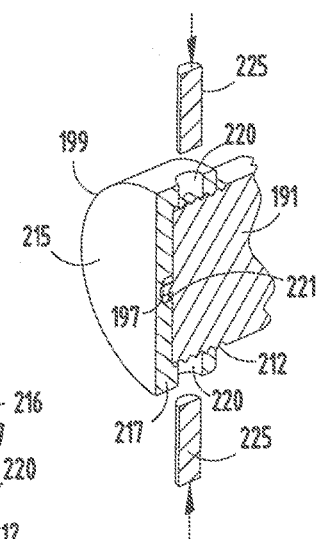
FIG. 54 is a fragmentary, cross-sectional view of one end of the two-piece guide pin, showing the guide pin head and guide pin body in an assembled condition, and staking tools to permanently interconnect the same.
Figure 55:
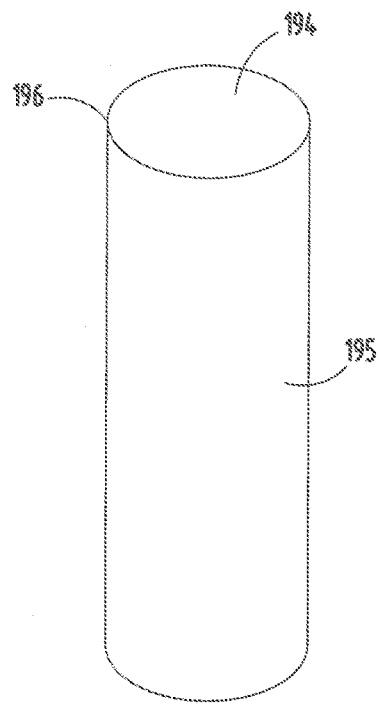
FIG. 55 is a perspective view of a guide pin bar stock used to make the two-piece guide pin.
Figure 56:
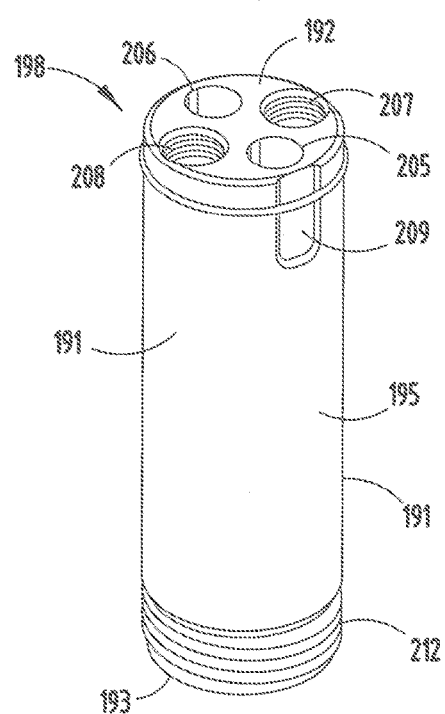
FIG. 56 is a perspective view of the guide pin body portion of the two-piece guide pin.
Figure 57:
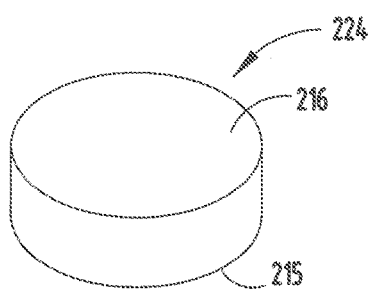
FIG. 57 is a perspective view of the guide pin head portion of the two-piece guide pin, taken from an exterior side thereof.
Figure 58:
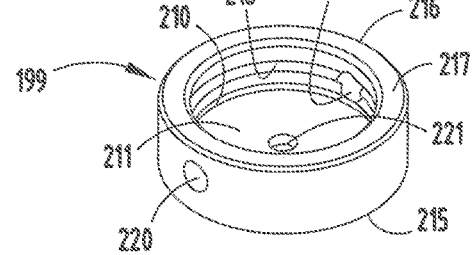
FIG. 58 is a perspective view of the guide pin head portion of the two-piece guide pin, taken from an interior portion thereof.
Figure 59:
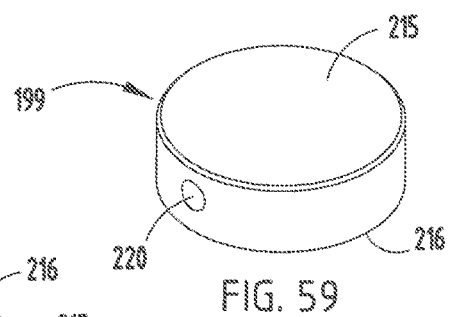
FIG. 59 is a perspective view of the guide pin head portion of the two-piece guide pin, taken from an exterior side thereof, and shown after an etching process for marking the same.

A process embodying the present invention for making two-piece guide pin 190 is as follows. An elongate, solid bar of steel guide pin body stock 184 (FIG. 55) is selected having a cylindrical shape with a hard and smooth finished exterior surface having a predetermined outside diameter that is identical to that of the finished guide pin body 191. A chrome plated, solid steel rod has been found particularly beneficial, since it incorporates a very smooth, hard, mirror-like outer surface that is suitable for low friction, sliding reciprocal motion in an associated die bore or aperture. The bar of guide pin body stock 184 is cut into a plurality of blanks 196 having lengths commensurate with the height of the finished two-piece guide pin 190. More specifically, as described above, a cutoff tool is inserted radially into the bar stock 184 to a point where the remaining material severs, thereby forming cutoff nub 197 at the second end 193 of the guide pin body, as shown in FIGS. 52-53. In order to minimize processing time, cost and machining steps, cutoff nub 197 is simply left in place. The alignment member 198 is then machined into the first end 192 of guide pin body 191, and the external thread 212 is formed on the second end 193 of guide pin body 191. A solid bar of guide pin head stock is selected with a predetermined outside diameter that is substantially greater than the outside diameter of the bar of guide pin body stock 184, so as to create the enlarged head portion 183 of two-piece guide pin 180. The bar of guide pin head stock is then cut in longitudinal segments to define a plurality of disc-shaped guide pin head blanks 224 (FIG. 57). For each guide pin head 199, a circular recess 216 is formed in the interior face 216 thereof to define the cylindrically-shaped sidewall 217. The recess 210 is positioned, shaped and sized to receive therein the second end 193 of the guide pin body 181. An internal thread 218 is then formed in the sidewall 217 of the recess 210 of each guide pin head blanks 224, which has a relative coarse, deep thread and mates closely with the external thread 212 on the second end 193 of guide pin body 191. A pair of radially oriented apertures 220 are formed through the sidewall 217 of the guide pin head 199 and communicate with the recess 210 therein. A blind hole 221 is formed in the bottom wall 211 of guide pin head 199 with a shape and position to wholly receive therein cutoff nub 197, as shown in FIGS. 53 and 54. Identification indicia may be etched or otherwise applied to the flat exterior face 215 of guide pin head 183, as shown in FIG. 59. The externally threaded second end 193 of the guide pin body 191 is then screwed into the internally threaded recess 210 in the guide pin head 199 to threadedly connect the guide pin head 183 with the guide pin body 181. Preferably, the guide pin head 183 and guide pin body 181 are simply hand tightened together, so as to minimize processing time and effort. In one embodiment of the present invention, one or more staking tools 225 (FIG. 54) are then driven through the radial apertures 220 in the guide pin head 183 and against adjacent portions of the external thread 212 on the second end 193 of the guide pin body 181 to upset the same, and thereby permanently interconnect the guide pin body 181 and the guide pin head 183 to define the enlarged head portion of the two-piece guide pin 180 that serves to positively limit travel between the die shoe and the die pad.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is as follows:

1. A two-piece guide pin for metal forming dies having first and second die members mounted a spaced apart distance from one another for mutual reciprocation between converged and diverged positions, comprising:
    a guide pin body having first and second ends, a cylindrical shape, and a hard and smooth finished exterior surface having a predetermined outside diameter selected for close reception in an associated die member bore for precisely guiding reciprocal motion between the first and second die members with an external thread formed on said guide pin body at a location adjacent to said second end thereof;
    an alignment member formed on the first end of the guide pin body to precisely locate the first end of the guide pin on one die member;
    a guide pin head formed from a cut length of an elongate, solid bar of guide pin head stock having a predetermined outside diameter that is substantially greater than said outside diameter of said bar of guide pin body stock, having a recess with a cylindrically-shaped sidewall formed in an interior face of said guide pin head sized to receive therein said second end of said guide pin body and an internal thread formed in said sidewall of said recess in said guide pin head which threadedly mates with said external thread on said second end of said guide pin body; and wherein
    said guide pin head is rigidly connected with the second end of the guide pin body in a generally concentric relationship to define an enlarged head that serves to positively limit travel between the first and second die members.

2. A two-piece guide pin as set forth in claim 1, including:
    at least one radially oriented aperture formed through said sidewall of said guide pin head which communicates with said recess therein, and is shaped to receive therein a tool which abuts against an adjacent portion of said external thread on said second end of said guide pin body to upset the same and thereby permanently interconnect said guide pin body and said guide pin head.

3. A two-piece guide pin as set forth in claim 2, wherein:
    said guide pin body includes a cutoff nub on said second end of said guide pin body to avoid further machining of the same; and
    said guide pin head has an aperture in the bottom of said recess in which said cutoff nub on said second end of said guide pin is wholly received.

4. A two-piece guide pin as set forth in claim 3, wherein:
    said aperture comprises a blind hole in said bottom wall of said recess, such that the exterior face of said guide pin head is substantially flat and imperforate.

5. A two-piece guide pin as set forth in claim 4, wherein:
    said exterior surface of said bar of guide pin body stock has a layer of chrome plated thereon.

6. A two-piece guide pin as set forth in claim 1, wherein:
    said guide pin body is formed from an elongate, cylindrical stock of steel.

7. A guided keeper assembly for a metal forming die having first and second die members mounted a spaced apart distance for reciprocation between converged and diverged positions, the improvement of a guided keeper assembly comprising:
    a base with a mounting face shaped to abut an adjacent face of the first die member, at least one connector portion for detachably mounting the base to the first die member, and a central aperture extending axially through a central portion of the base;
    a guide pin body having first and second ends, a cylindrical shape, and a hard and smooth finished exterior surface having a predetermined outside diameter selected for close reception in the central aperture of the base and in an associated die member bore in the first die member for precisely guiding reciprocal motion between the first and second die members;
    an alignment member formed on the first end of the guide pin body to precisely locate the first end of the guide pin on one die member;
    a guide pin head formed from a cut length of an elongate, solid bar of guide pin head stock having a predetermined outside diameter that is substantially greater than said outside diameter of said bar of guide pin body stock; and wherein
    said guide pin head is rigidly connected with the second end of the guide pin body in a generally concentric relationship to define an enlarged head that serves to positively limit travel between the first and second die members.

8. A guided keeper assembly as set forth in claim 7, including:
    an external thread formed on said guide pin body at a location adjacent to said second end thereof;

a recess with a cylindrically-shaped sidewall formed in an interior face of said guide pin head sized to receive therein said second end of said guide pin body; and an internal thread formed in said sidewall of said recess in said guide pin head which threadedly mates with said external thread on said second end of said guide pin body.

9. A guided keeper assembly as set forth in claim 8, including:

at least one radially oriented aperture formed through said sidewall of said guide pin head which communicates with said recess therein, and is shaped to receive therein a tool which abuts against an adjacent portion of said external thread on said second end of said guide pin body to upset the same and thereby permanently interconnect said guide pin body and said guide pin head.

10. A guided keeper assembly as set forth in claim 9, wherein:

said guide pin body includes a cutoff nub on said second end of said guide pin body to avoid further machining of the same; and said guide pin head has an aperture in the bottom of said recess in which said cutoff nub on said second end of said guide pin is wholly received.

\* \* \* \* \*